Dec. 31, 1935.  J. R. TOMLIN  2,026,443
FOLDING MECHANISM
Filed Nov. 3, 1930  21 Sheets-Sheet 8
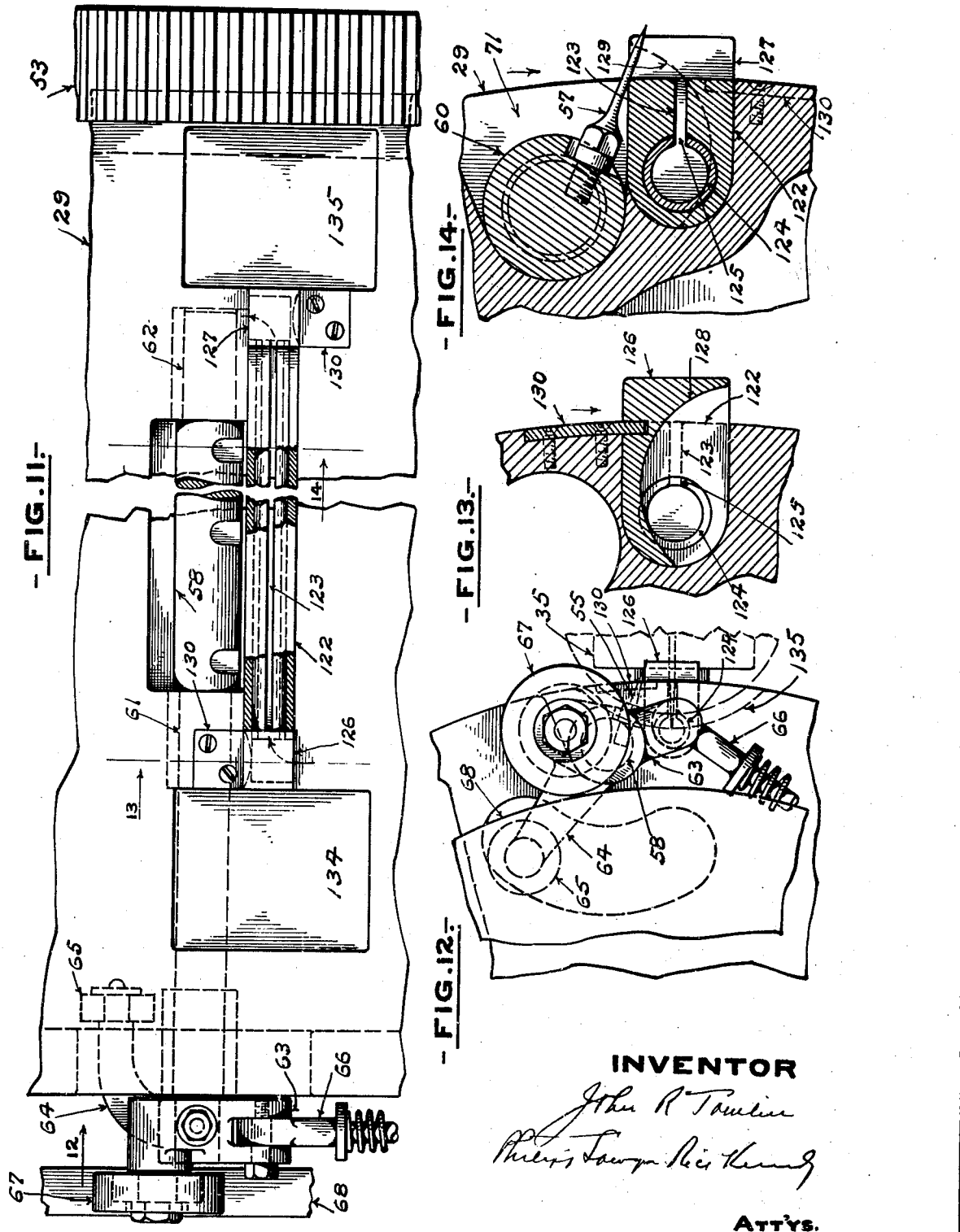
INVENTOR
John R Tomlin
ATT'YS.

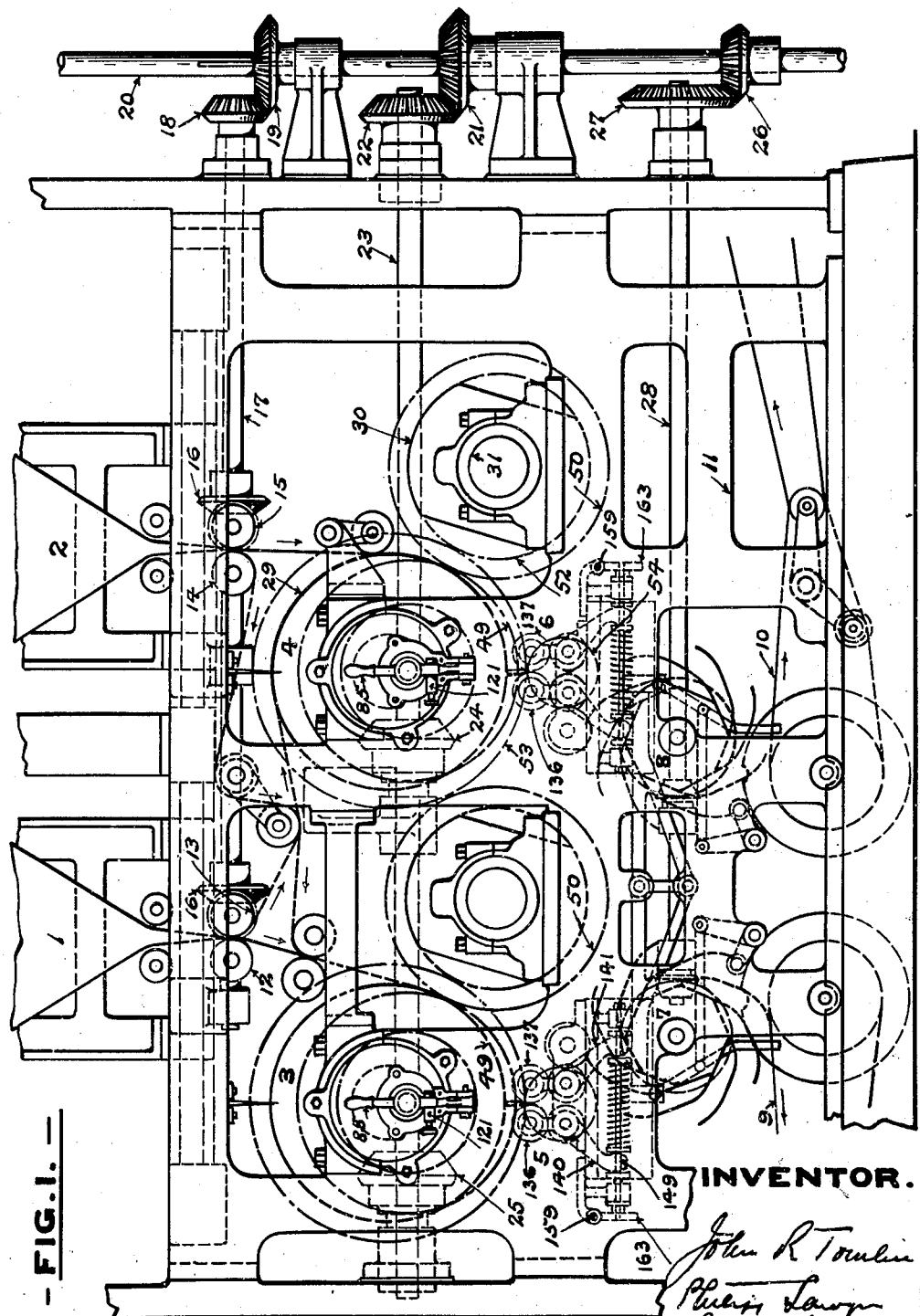

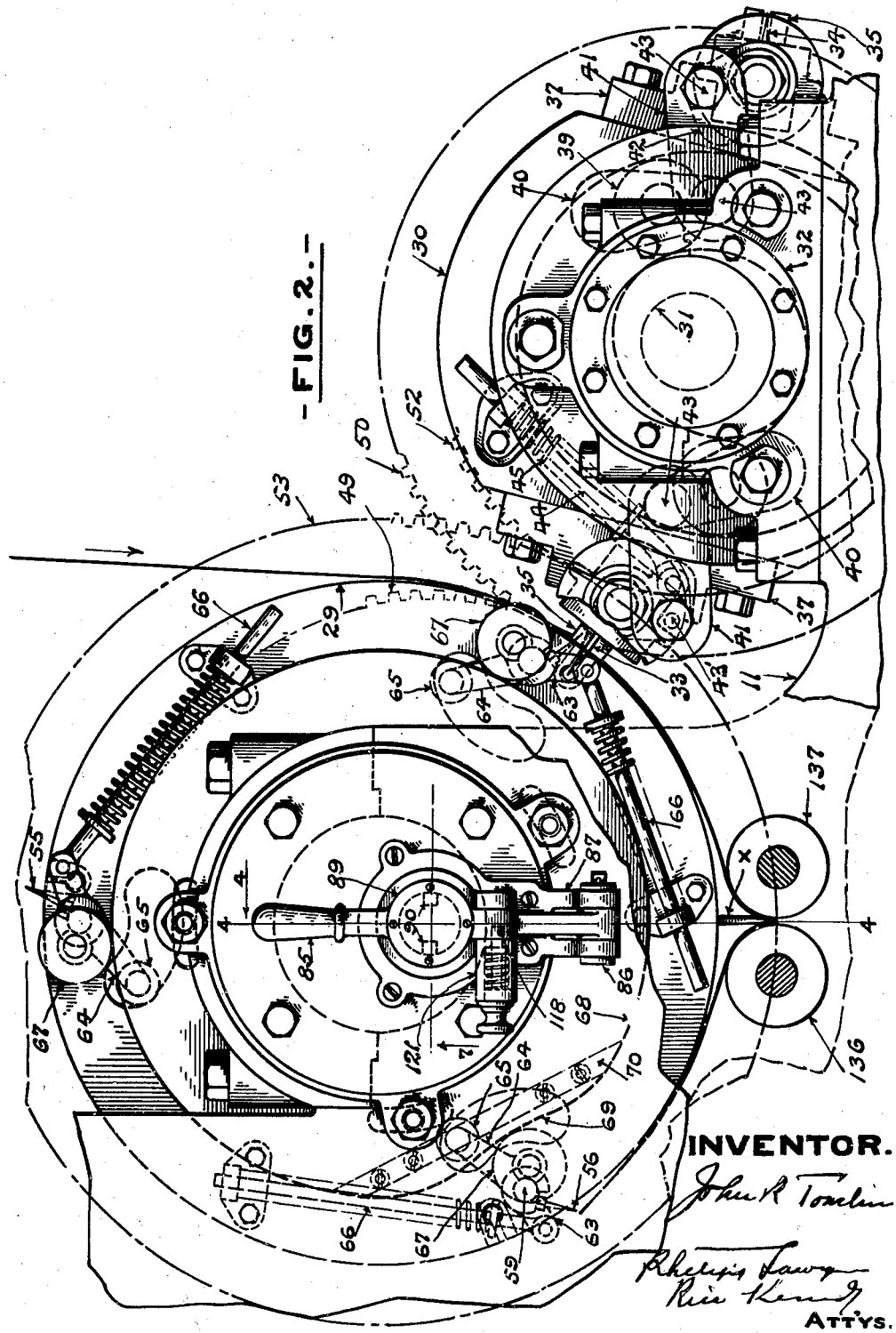

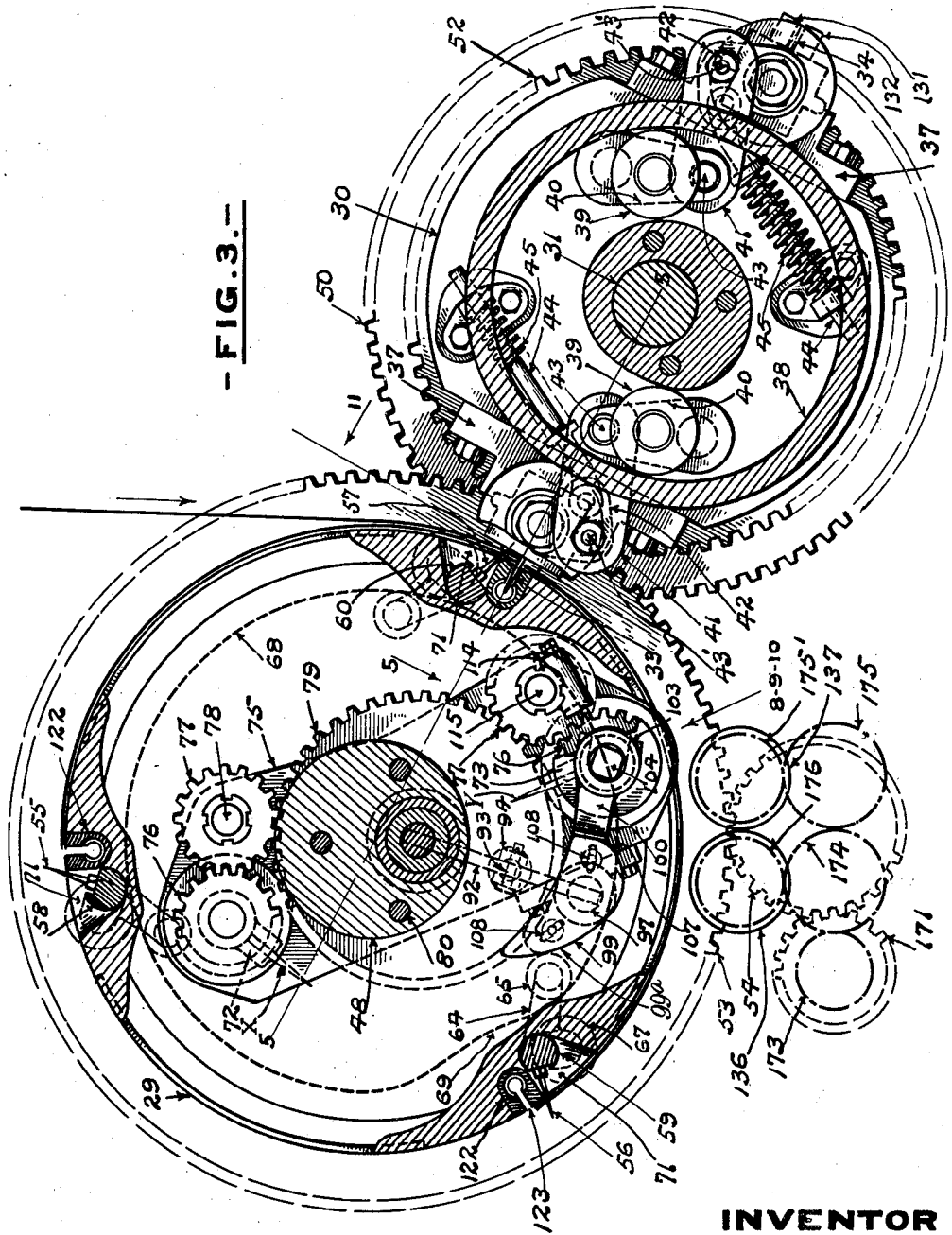

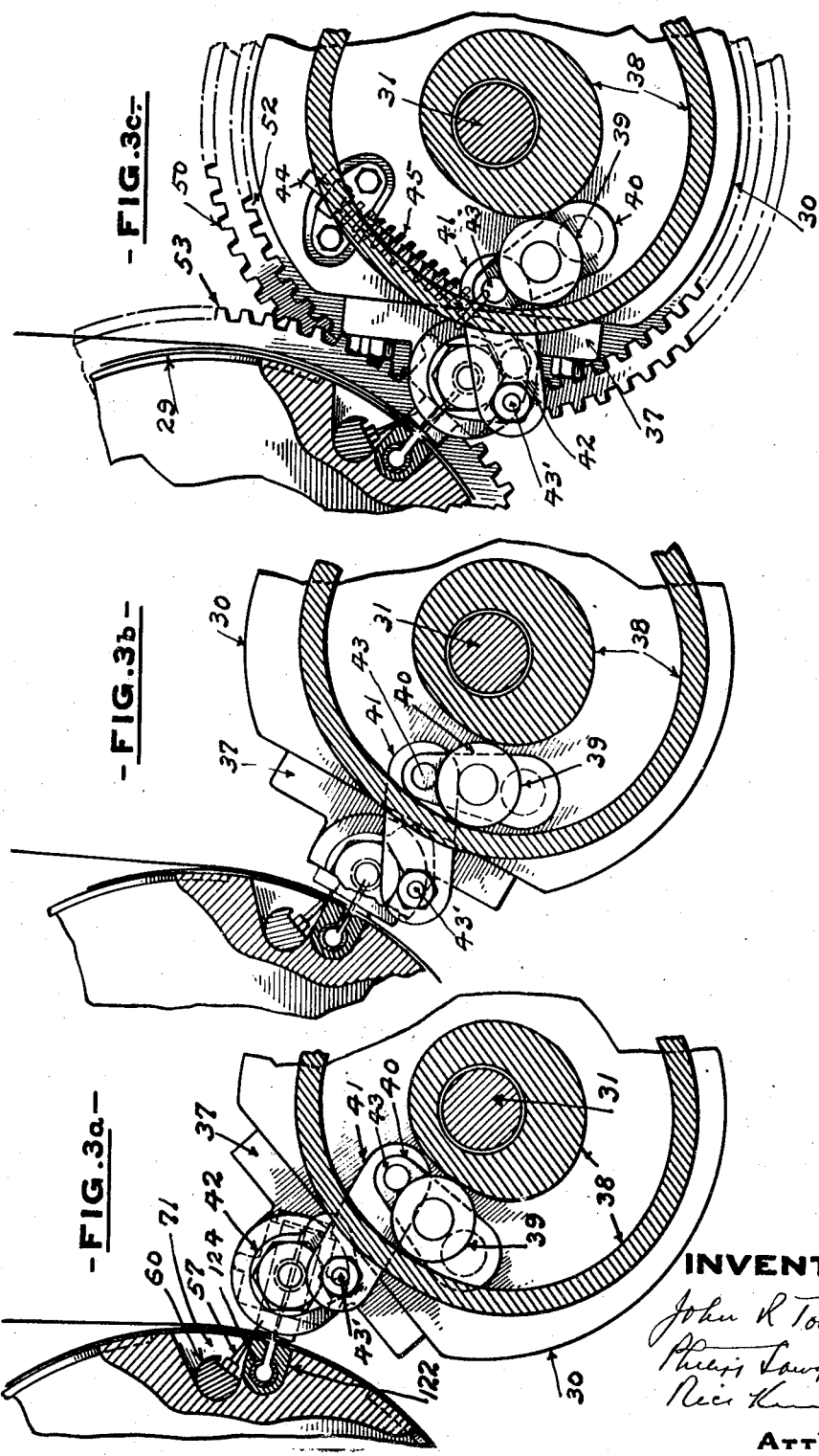

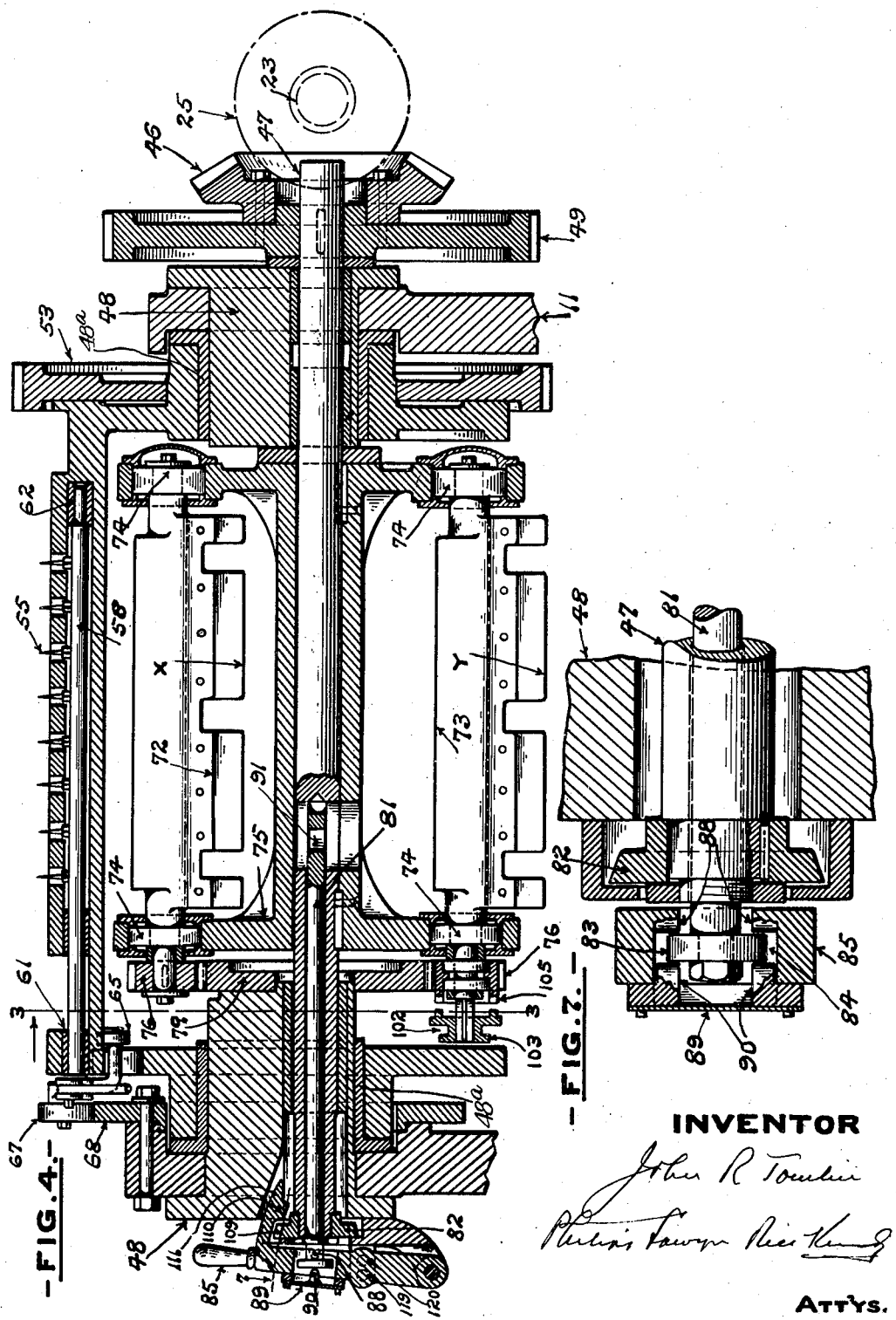

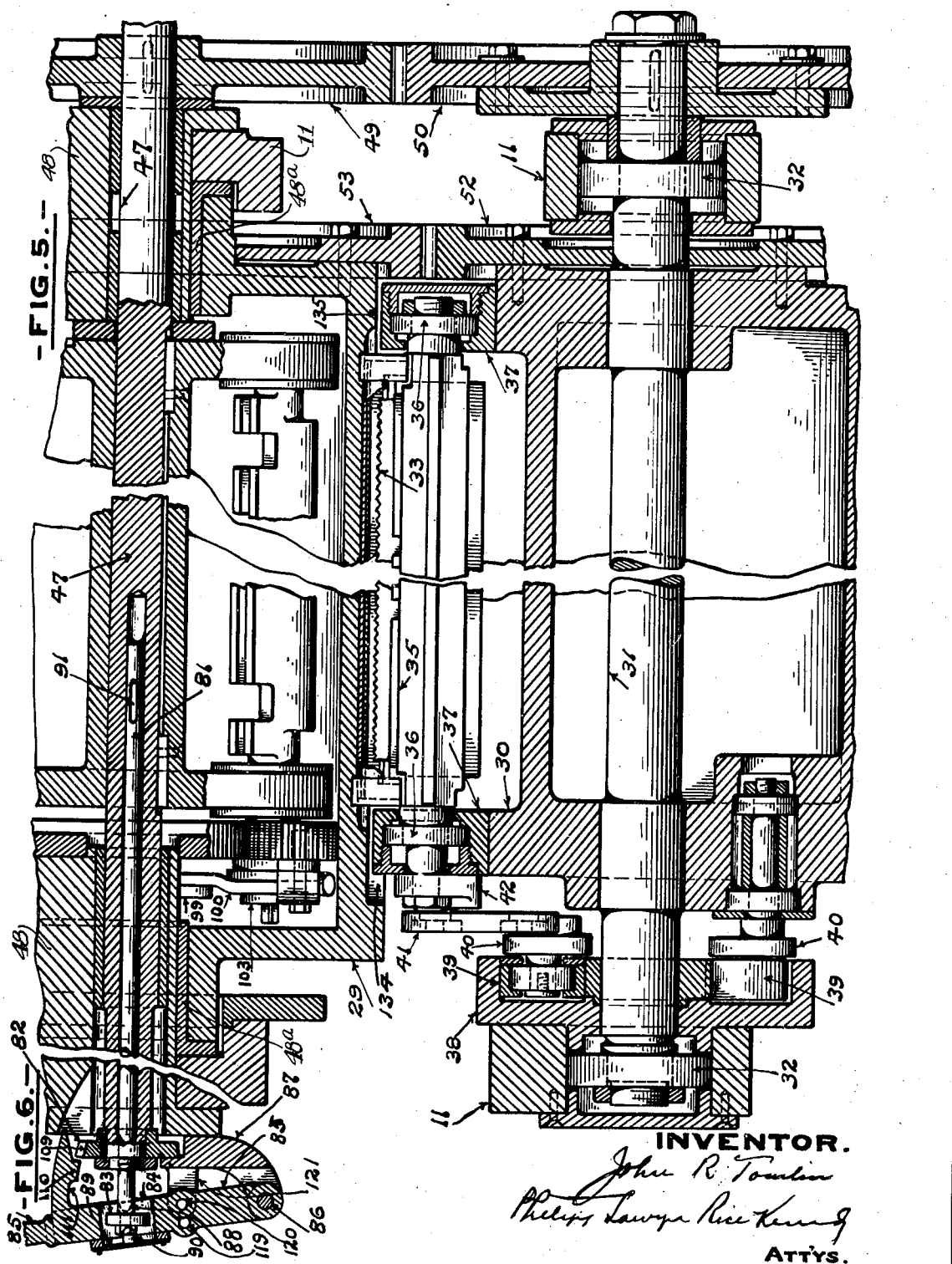

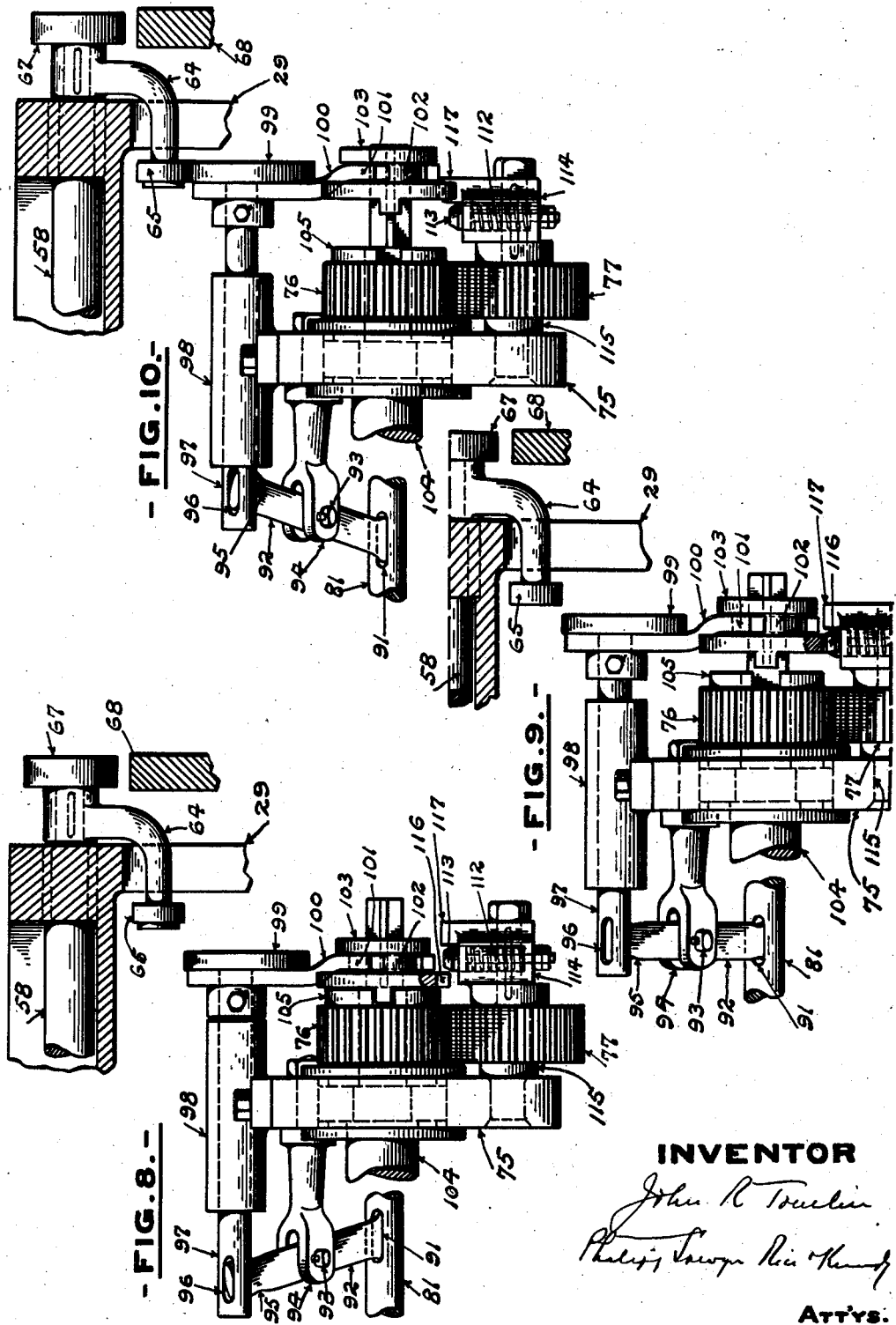

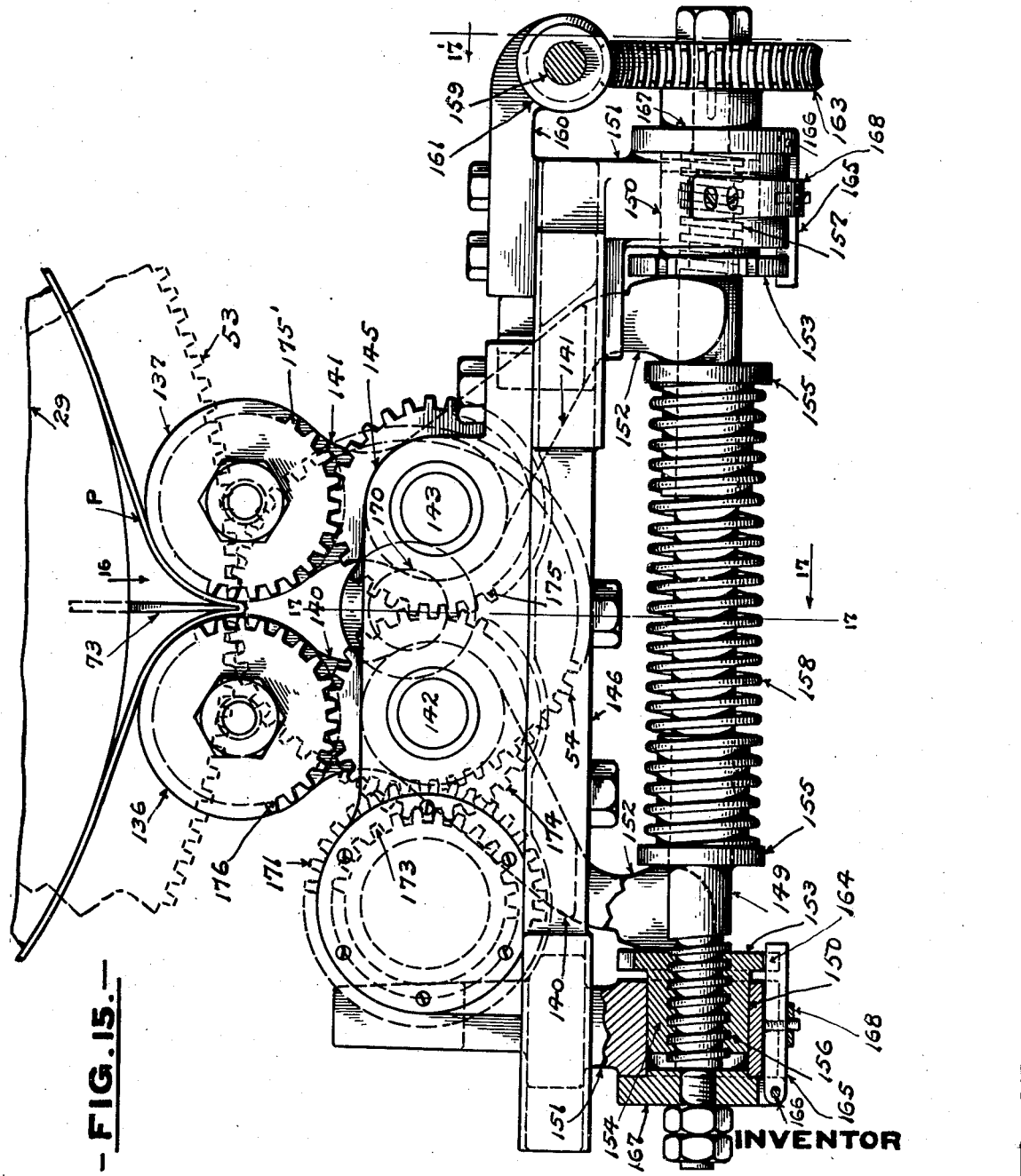

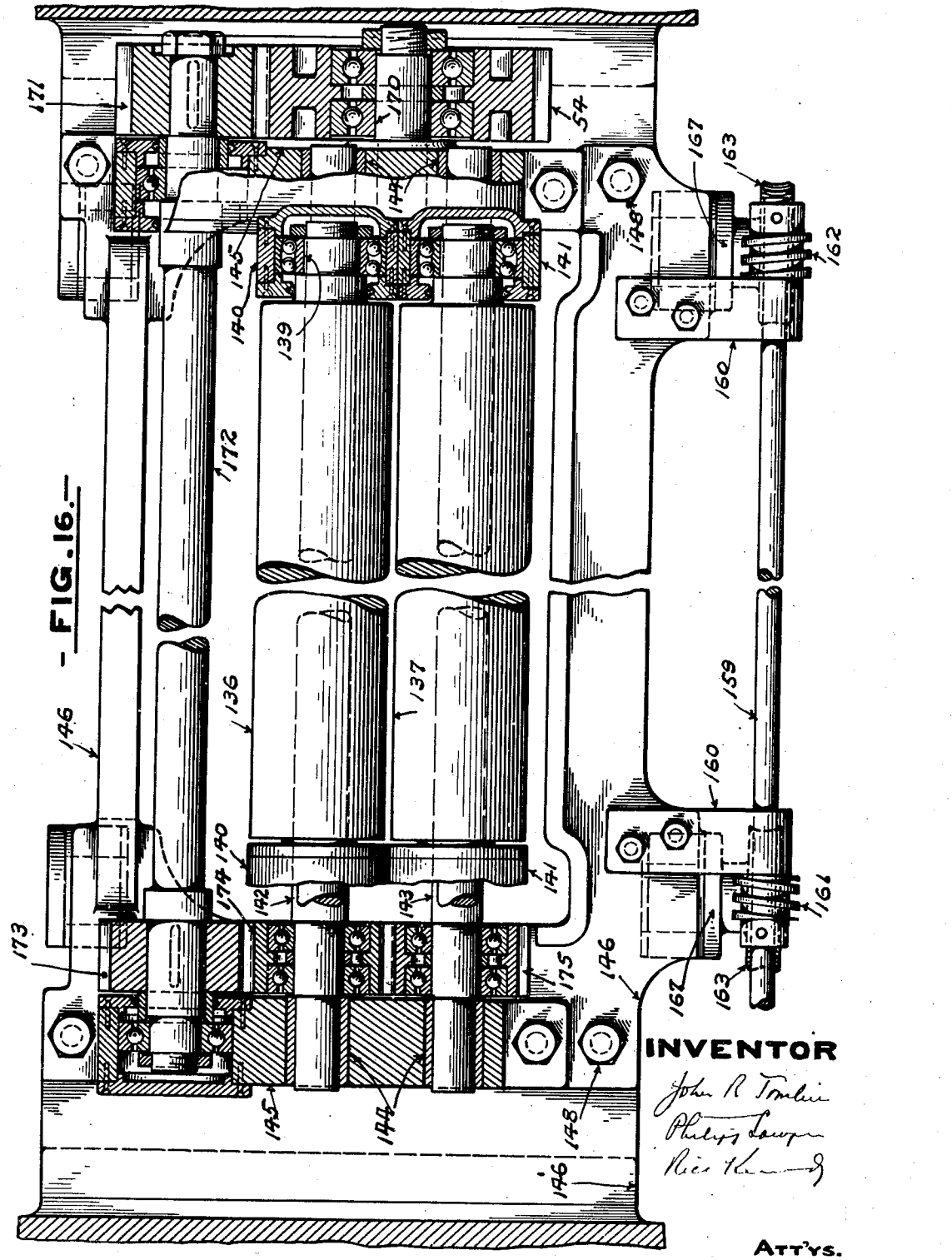

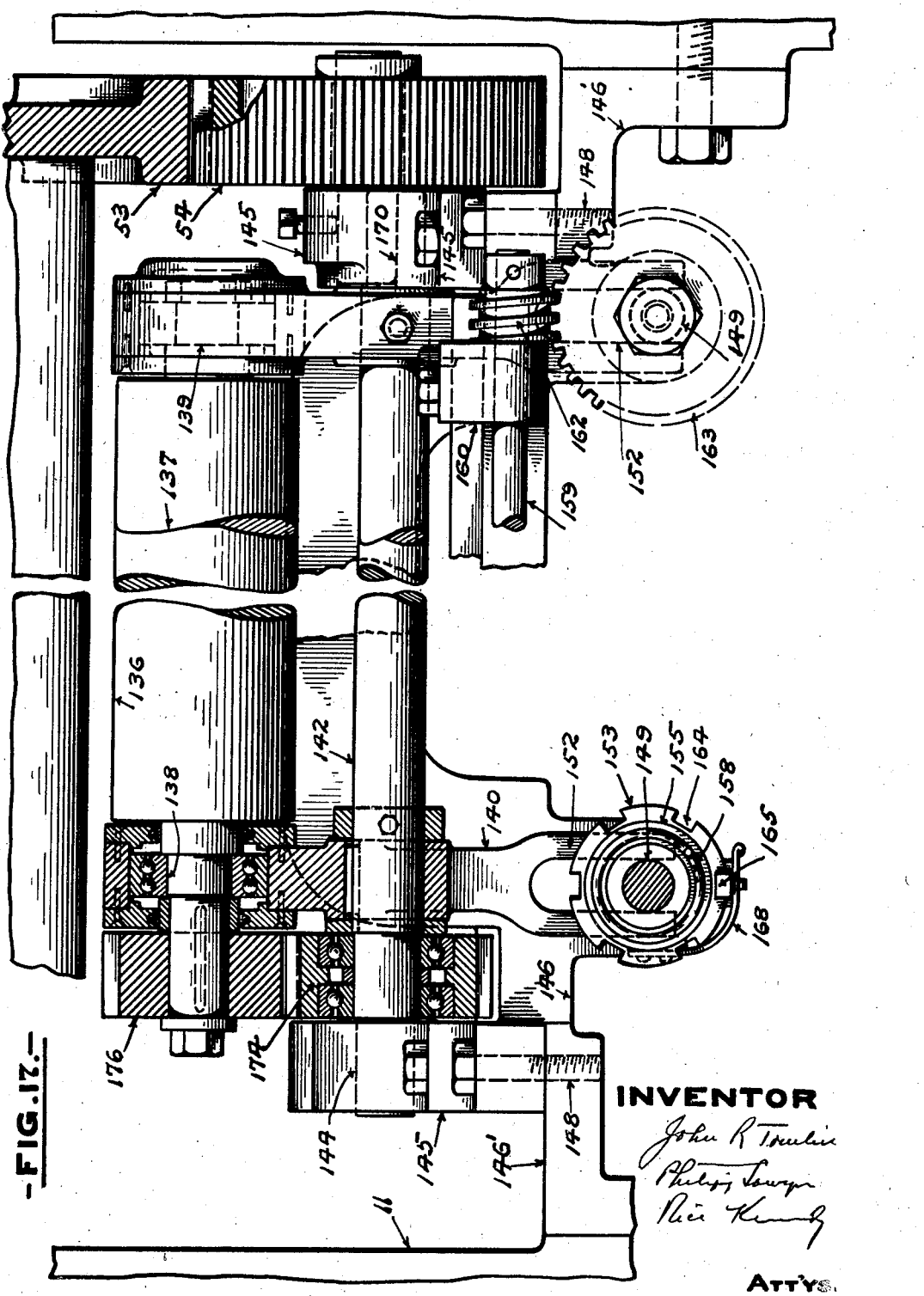

Dec. 31, 1935.   J. R. TOMLIN   2,026,443
FOLDING MECHANISM
Filed Nov. 3, 1930   21 Sheets-Sheet 12
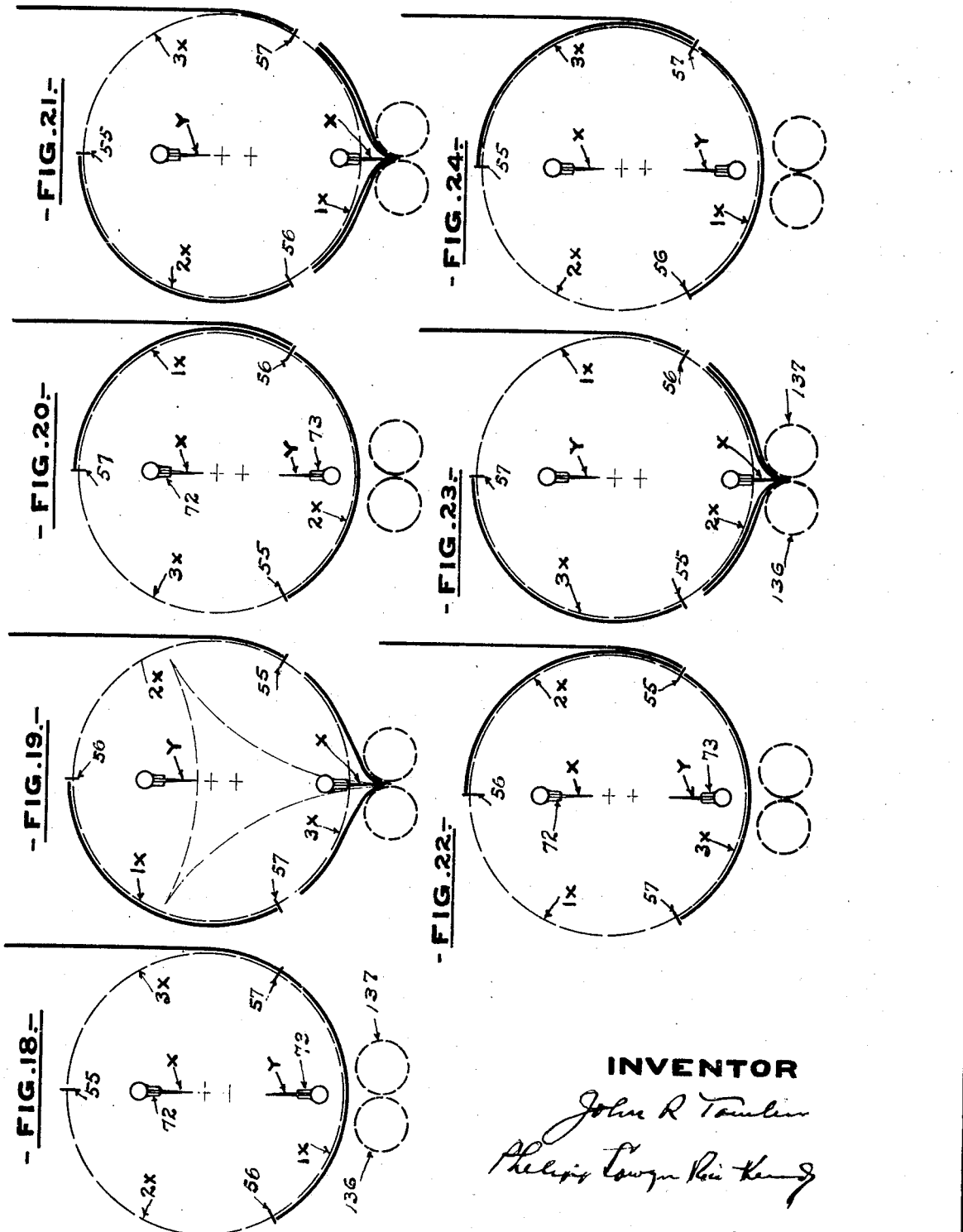
INVENTOR
John R Tomlin
ATT'YS.

Dec. 31, 1935.　　　　　J. R. TOMLIN　　　　　2,026,443
FOLDING MECHANISM
Filed Nov. 3, 1930　　21 Sheets-Sheet 13
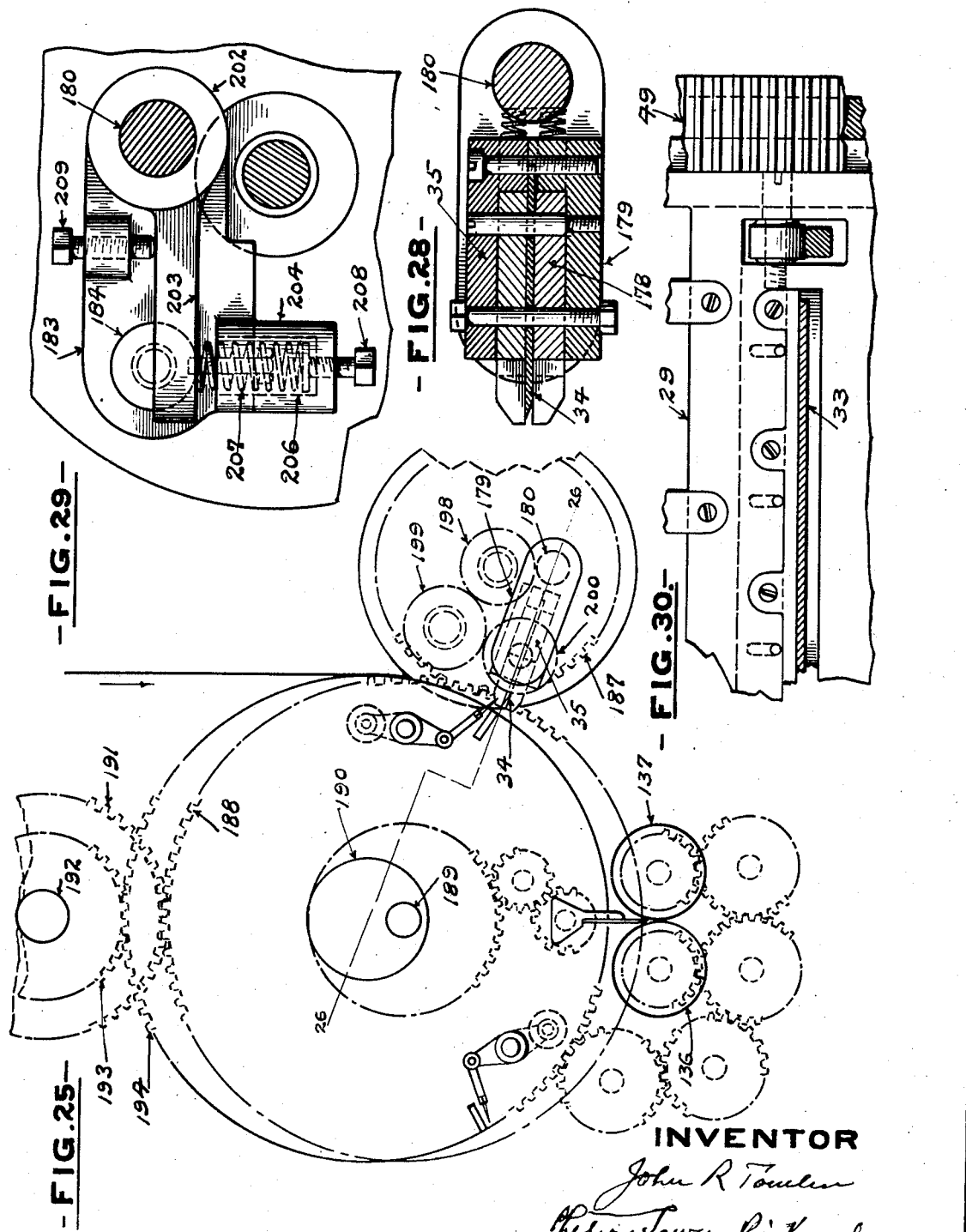
INVENTOR
John R Tomlin
Phelps Sawyer Rickards
ATT'YS.

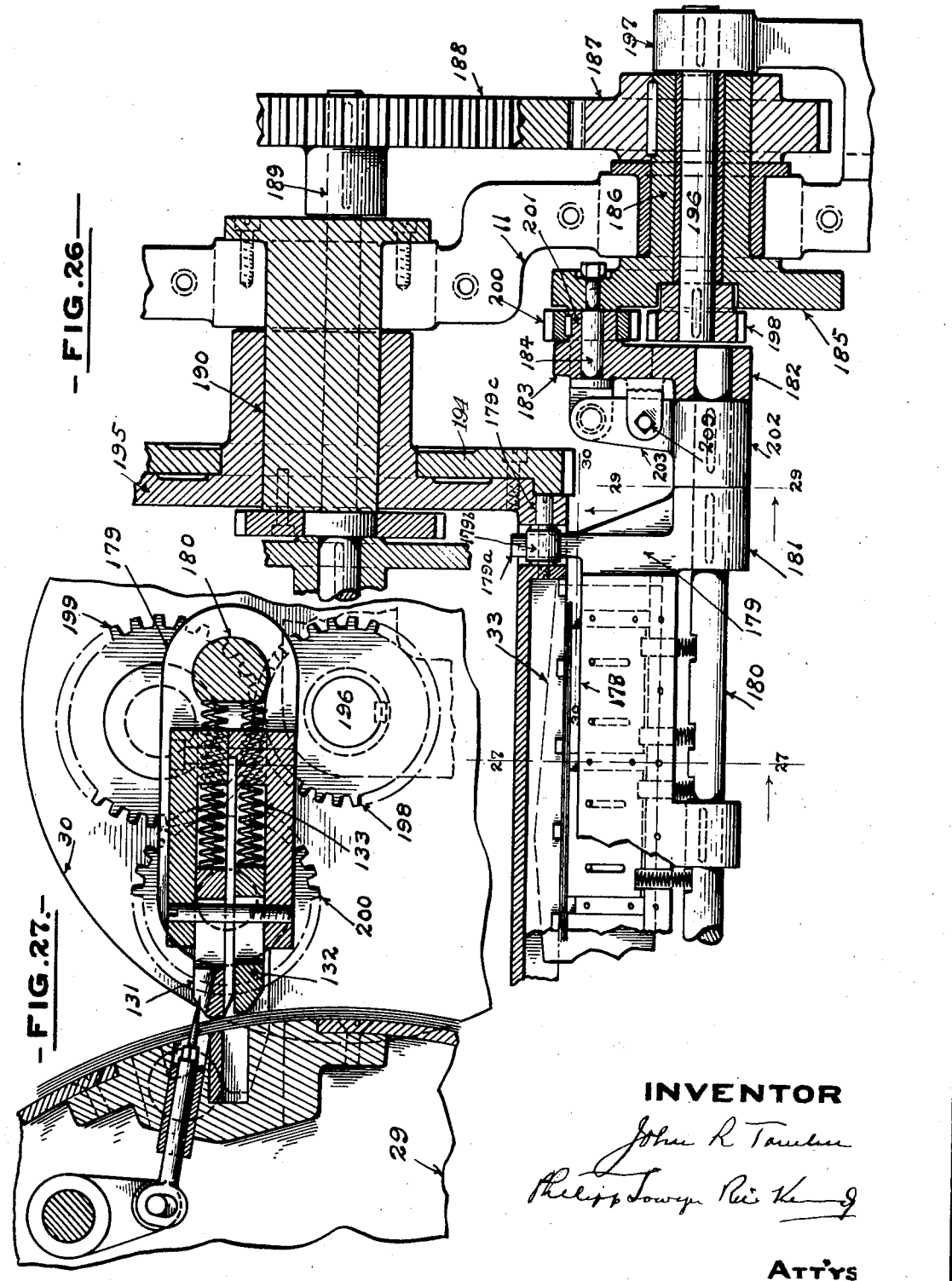

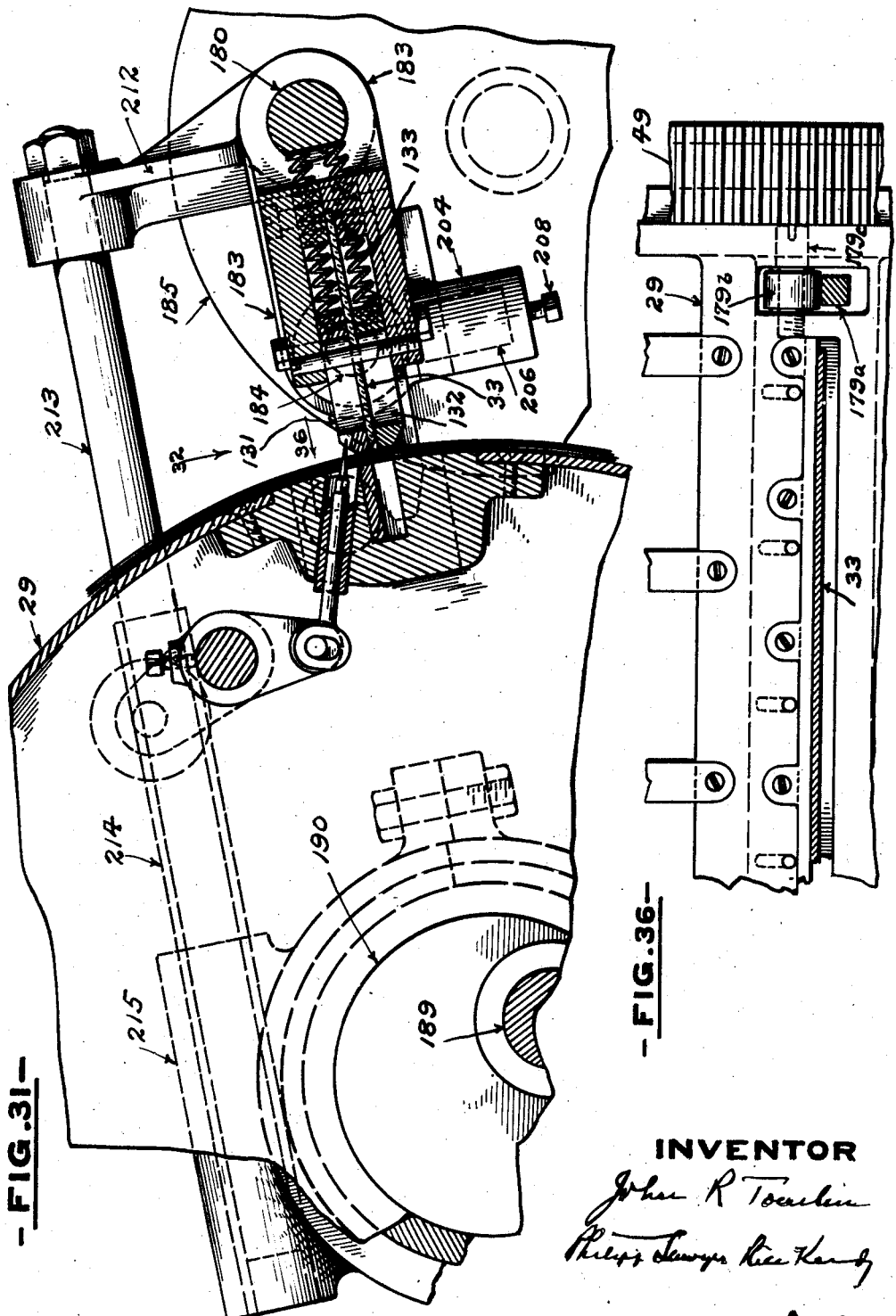

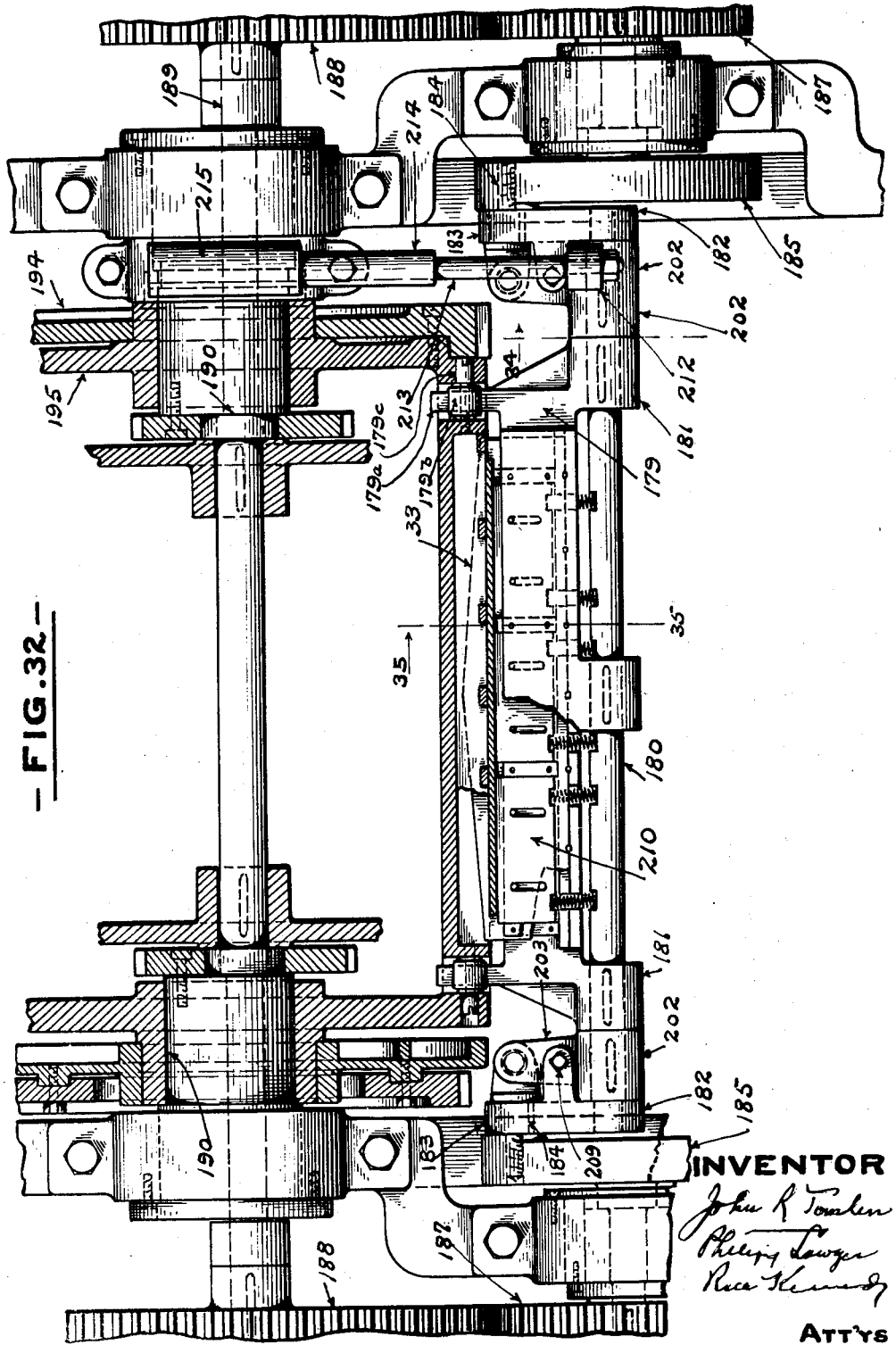

Dec. 31, 1935.  J. R. TOMLIN  2,026,443
FOLDING MECHANISM
Filed Nov. 3, 1930  21 Sheets-Sheet 17
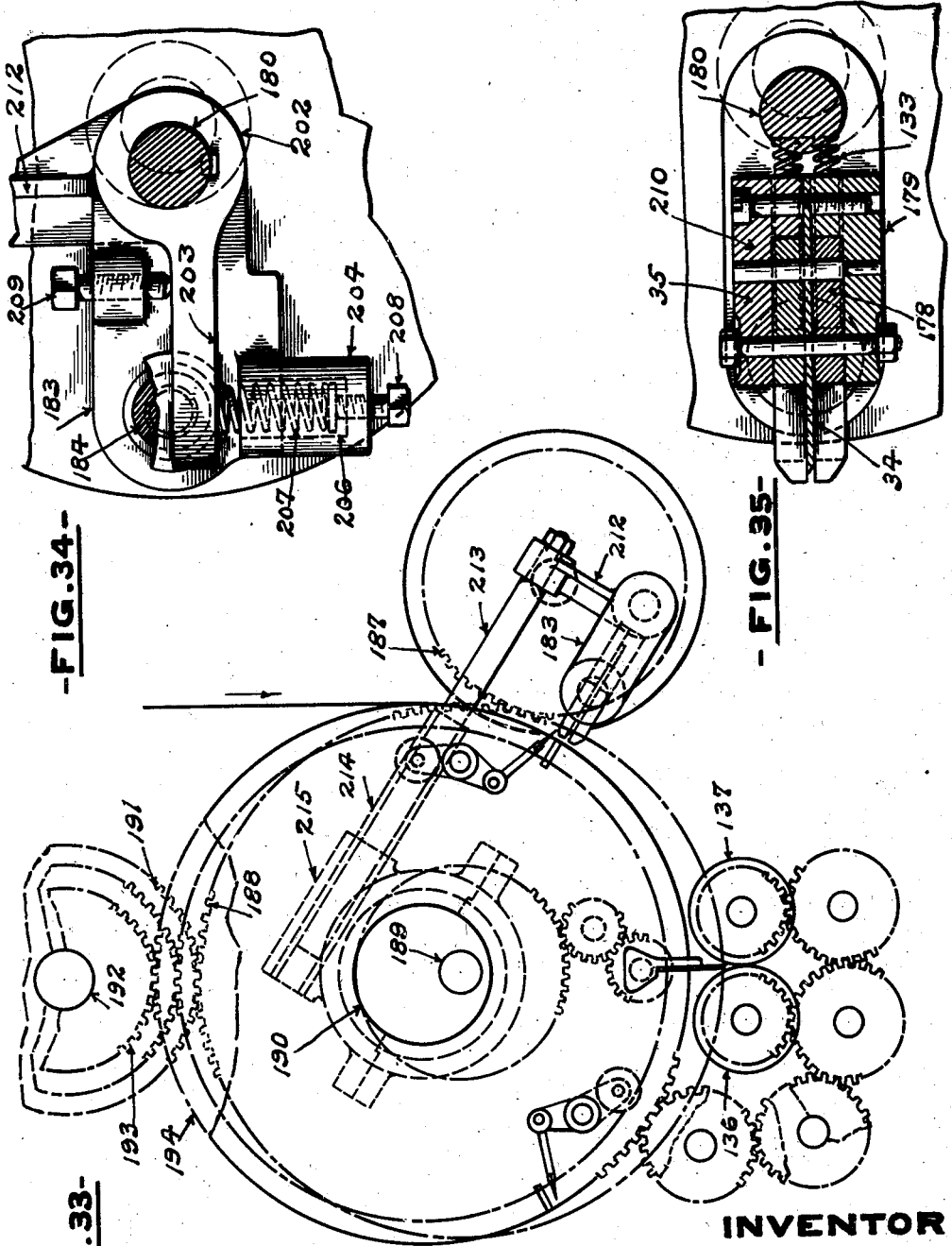
INVENTOR
John R Tomlin
Phillips Lowyer Rew Kennedy
ATT'YS

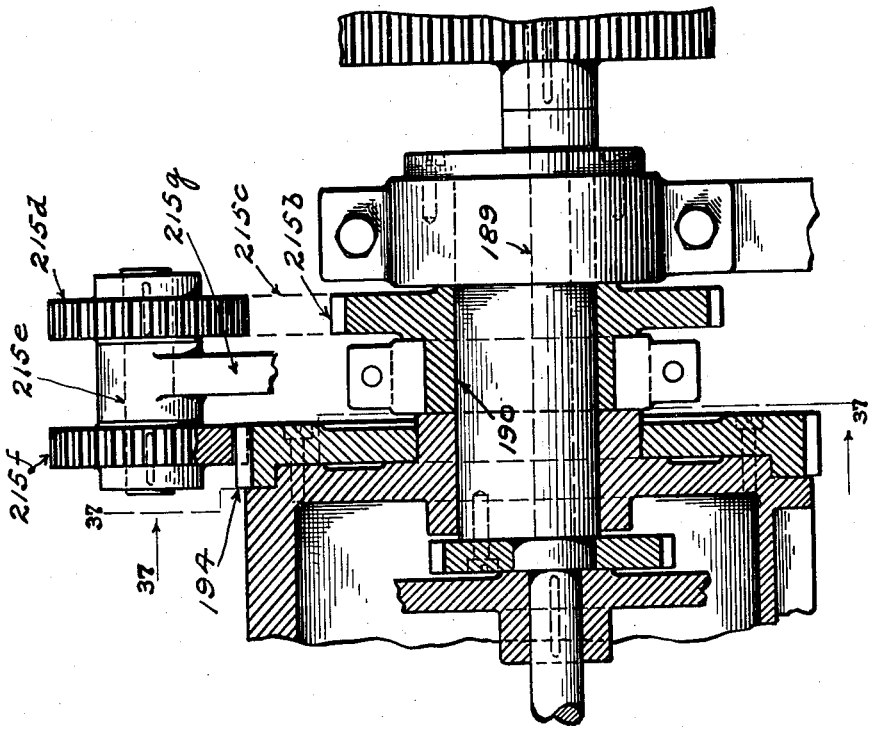
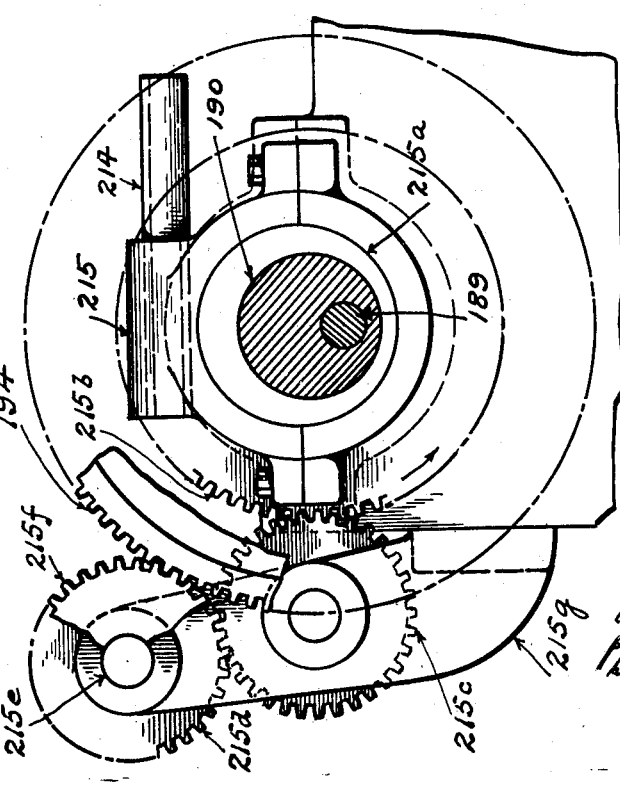

Dec. 31, 1935.  J. R. TOMLIN  2,026,443
FOLDING MECHANISM
Filed Nov. 3, 1930  21 Sheets-Sheet 19
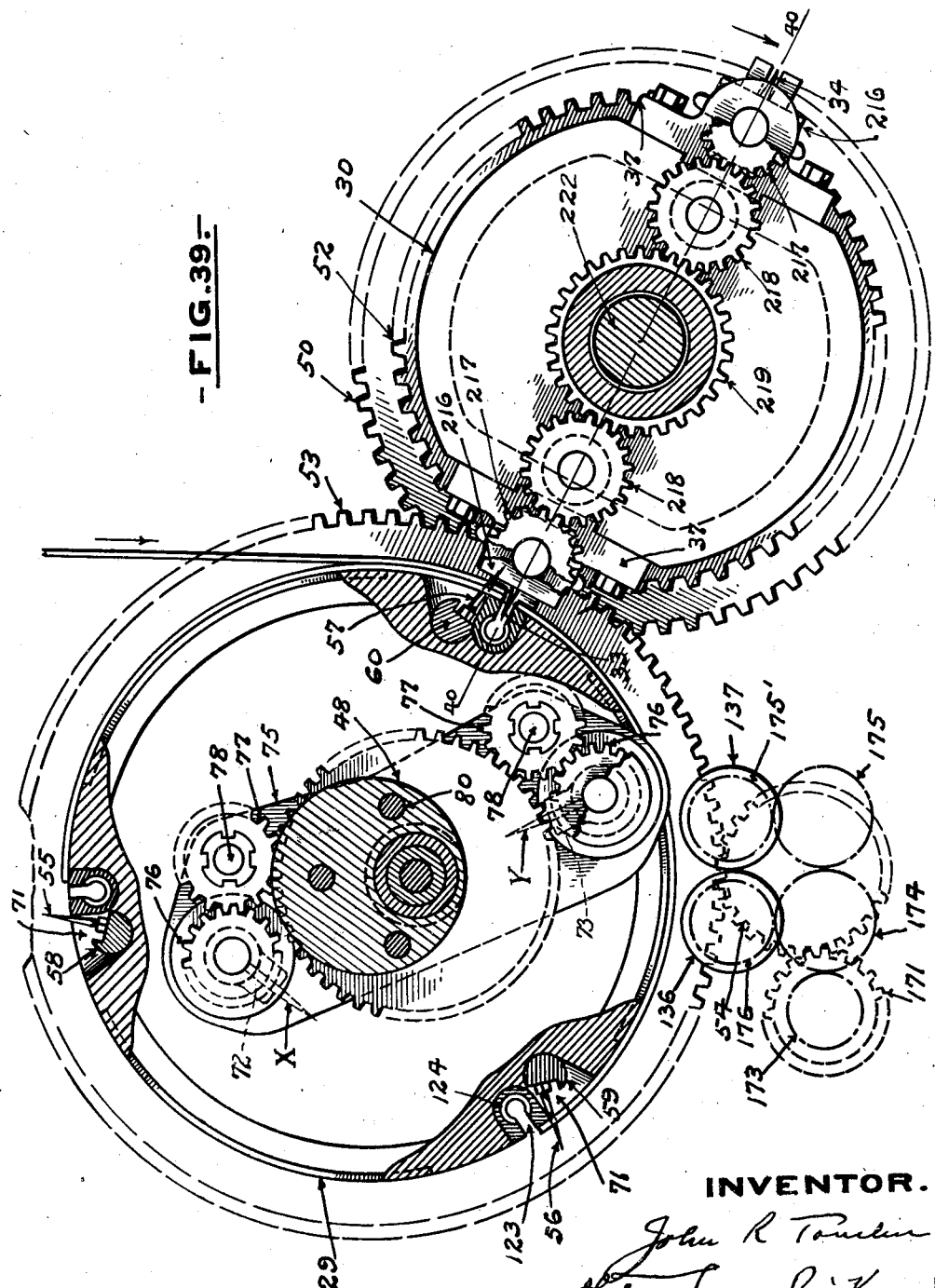
INVENTOR.
John R Tomlin
ATT'YS.

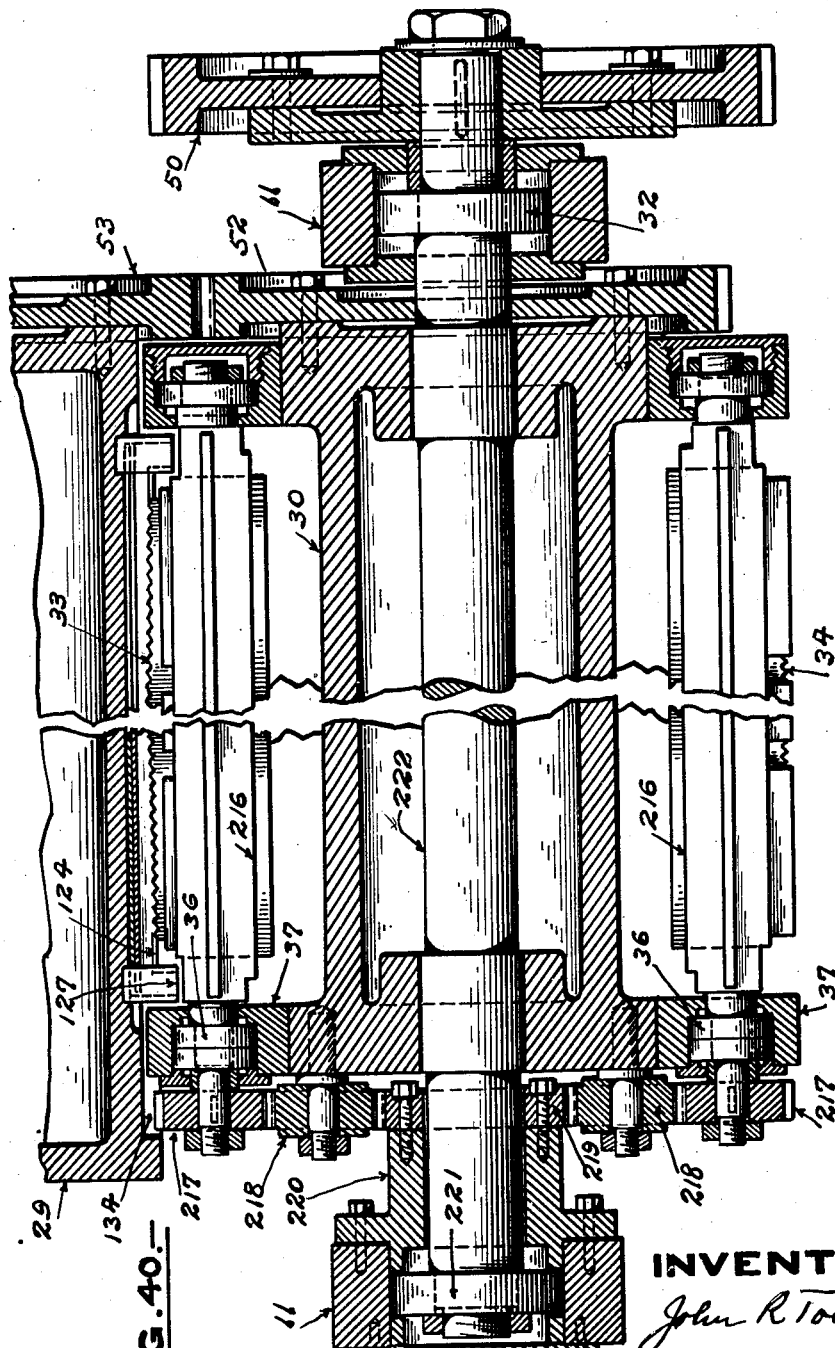

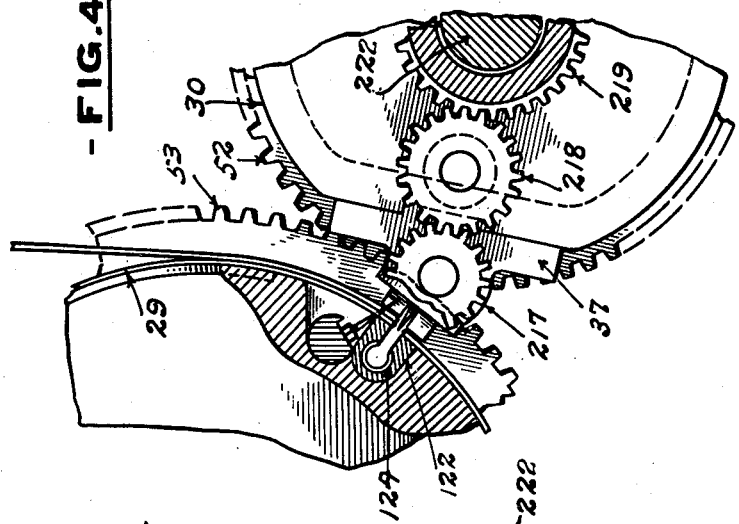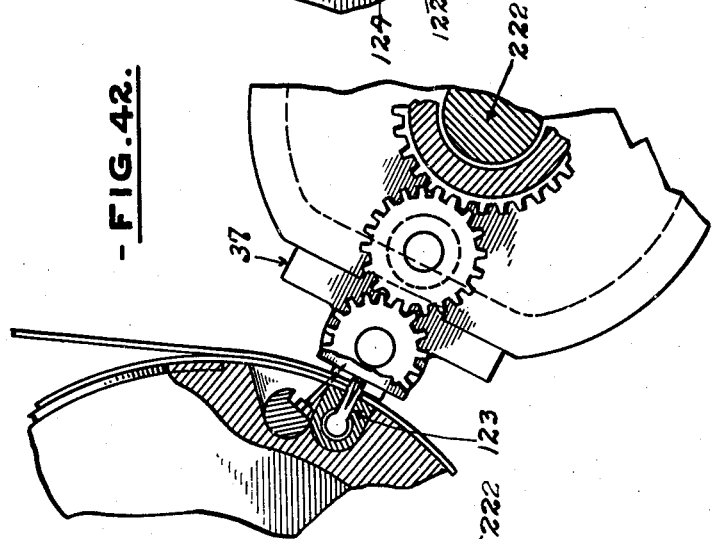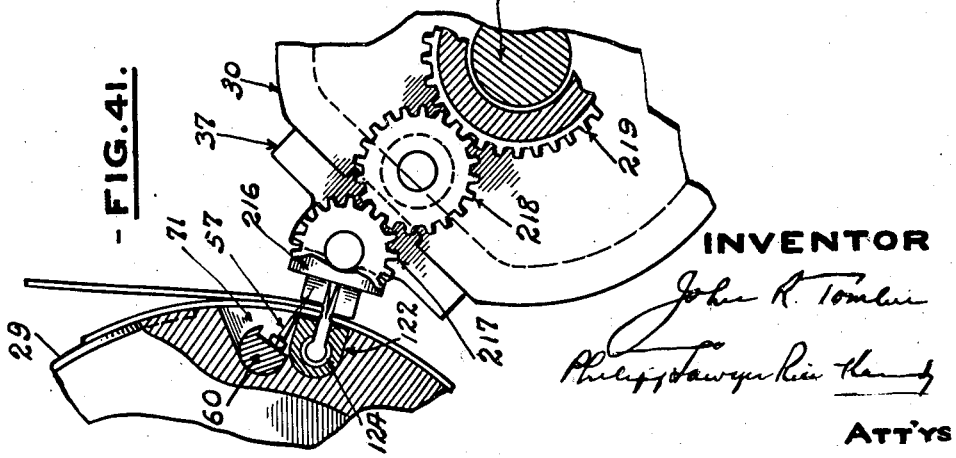

Patented Dec. 31, 1935

2,026,443

UNITED STATES PATENT OFFICE 2,026,443

FOLDING MECHANISM

John R. Tomlin, Brooklyn, N. Y., assignor to R. Hoe & Co., Inc., New York, N. Y., a corporation of New York; Irving Trust Company, permanent trustee Application November 3, 1930, Serial No. 492,990

57 Claims. (Cl. 270—65)

This invention relates to certain improvements in printing machines and has been designed particularly for improving what may be termed the folder end of such machines, that is, the mechanism which folds the product after it has been printed by suitable printing mechanism.

An especial object of the invention is the provision of a simplified mechanism whereby the folding operations may be conducted at a higher speed than with other folding mechanisms with which I am familiar, and in which accurate cutting, folding and delivering of products of a varying number of pages may be speedily and efficiently effected.

A further object of the invention is the provision of a cutting mechanism of improved construction for cutting a web or associated webs into product lengths in which the cutting blade is manipulated so as to the maintained in a position substantially radial to the axis of the folding cylinder while it enters or engages the product during the cutting operation and while it is being withdrawn. Such manipulation of the cutting blade avoids side strains on the cutting knife, thus prolonging the life of the knife, and by so operating the knife in making the cut a knife having a diagonal cutting edge may be used, so that a shear cut may be obtained, which is particularly advantageous in operating on thick products.

A further object of the present invention is to provide an improved pin operating mechanism in which the pins are supported so as to have a rocking or rolling movement, that is, as the pins are freed from the product they have a rolling or rocking motion, thus dispensing with the quick acting cam mechanism heretofore used for withdrawing the pins, such construction being simpler and therefore much easier to construct and operate accurately without danger of tearing or otherwise injuring the product.

A further object of the invention is to produce an improved mechanism, operable from outside the folding cylinder, whereby the cylinder may be easily and quickly changed from a collecting cylinder to a non-collecting cylinder, that is, in one position of the parts the cylinder acts to collect sheets and in another position of the parts the sheets pass through and are folded off without being collected, this mechanism preferably operating in conjunction with the mechanism by which the sheet taking pins are operated.

A further object of the invention is to provide a folding mechanism from which products are delivered from a folding cylinder, such mechanism including folding rolls and means for driving them, removable from and replaceable in the machine as a unit.

An additional object of the invention is an improved construction for operating the folding pins and the cutting mechanism so that the head and the tail of the product are held on the folding cylinder until they have been engaged by the tucking blade, so that the product is under control at all times.

A further object of the invention is to provide an improved cutting block or abutment with which the cutting knife cooperates, this abutment being so formed that it is kept clear of the paper dust which is produced during the cutting operation, this clearing being effected by the movement of the folding cylinder, so that it is unnecessary to stop the machine for clearing the blocks during an ordinary run.

With these and other objects not specifically referred to, the invention consists in certain novel parts, arrangements and combinations which will be fully described in connection with the accompanying drawings and the novel features pointed out in the claims hereunto annexed.

In these drawings,—

Figure 1 is a general vertical end view of the improved folder mechanism, the construction shown illustrating a double folder, the printing mechanism not being shown;

Figure 2 is an end view, partly broken away, on an enlarged scale, showing a pair of the cutting and collecting cylinders shown in Figure 1;

Figure 3 is a sectional view of the cutting and collecting cylinders shown in Figure 2, taken on the line 3—3 of Figure 4;

Figures 3a, 3b and 3c are views, partly broken away and partly in section, showing the cutting and collecting cylinders of Figures 2 and 3, with the parts in different positions from those shown in such figures to more clearly illustrate the movement of the cutting knife during the cutting operation, Figure 3a showing the knife at the start of the operation, Figure 3b at the full cut, and Figure 3c showing the knife as it is withdrawn after the cut.

Figure 4 is a vertical section of the collecting cylinder shown in Figure 2 and illustrating the pin operating shaft, the folder blade, and shift mechanism for changing from collecting to non-collecting, the view being taken on line 4—4 and in the direction of arrow 4 of Figure 2;

Figure 5 is a longitudinal sectional view of part of the cutting and collecting cylinder shown in Figure 3, the view being taken on the diagonal line 5—5 of that figure looking in the direction of arrow 5;

Figure 6 is a detail sectional view of part of the shifting mechanism for changing from a collect to a non-collect run, with the parts in a different position from that shown in Figure 4.

Figure 7, which appears on the sheet with Figure 4, is a horizontal sectional view, on an enlarged scale, of part of the mechanism shown in Figure 6, the view being taken looking in the direction of arrow 7 of Figure 2;

Figures 8, 9 and 10 are enlarged detail views of the mechanism for changing from a collect to a non-collect run, the views being taken in the direction of arrows 8—9—10 of Figure 3, Figure 8 showing the mechanism in a non-collecting position, Figure 9 in a neutral position, and Figure 10 in the position the parts assume when adjusted for a collect run;

Figures 11, 12, 13 and 14 show detail parts; Figure 11 is a detail view, partly broken away and partly in section, of the collecting cylinder, the cutting abutment and parts of the pin mechanism, the view being taken in the direction of arrow 11 of Figure 3; Figure 12 is a broken away detail view, on an enlarged scale, of the mechanism shown at the left-hand end of Figure 11 looking in the direction of arrow 12 of that figure; Figure 13 is a detail sectional view of the cutting abutment, the view being taken in the direction of arrow 13 of Figure 11, and Figure 14 is a detail sectional view showing the cutting abutment and an adjacent sheet taking pin, the view being taken in the direction of arrow 14 of Figure 11;

Figure 15 is an end view, partly broken away and partly in section, of part of the folding mechanism showing the unit assembly of the folding rolls into which the sheets are folded off by the folding and collecting cylinder;

Figure 16 is a plan view, partly in section and partly broken away, showing the mechanism of Figure 15, the view being taken in the direction of arrow 16 of that figure;

Figure 17 is a vertical sectional view of the mechanism shown in Figures 15 and 16, the left-hand end of Figure 17 being taken on the line 17—17 of Figure 15 looking in the direction of arrow 17 of that figure, and the right-hand end of Figure 17 being a view looking in the direction of arrow 17' of Figure 15;

Figures 18 to 24, inclusive, show diagrammatically the position of the parts in the collecting of the product on the three part collecting cylinder shown in the heretofore described figures, it being understood that when collecting the folding blade y is silenced, the folding blade x acting to fold off the products from alternate sections of the cylinder as they pass by the folding-off rolls.

Figure 25 is a diagrammatic view of a modified mechanism which may be employed for effecting the radial action of the cutting knife;

Figure 26 is a partly broken away, partly sectional view taken on the diagonal line 26—26 of Figure 25 showing the knife operating mechanism;

Figure 27 is a detail sectional view, on an enlarged scale, showing the position of the cutting knife when it first engages the web or webs, the view showing the position of the knife at the start of the cutting operation, this view being taken on the line 27—27 of Figure 26;

Figure 28, which appears on the sheet with Figure 25, is a detail sectional view showing the parts of the knife holder and a means for securing these parts together;

Figure 29, which appears on the sheet with Figure 25, is a detail view, partly in section, of a cushioning means for the cutter blade, the view being taken on the line 29—29 of Figure 26 in the direction of arrow 29;

Figure 30, which appears on the sheet with Figure 25, is a detail view showing one of the guide-rolls for the cutting knife, the view being taken on the line 30—30 of Figure 26 in the direction of the arrow;

Figure 31 is a partly broken away side view of a modified form of mechanism for so guiding the cutting knife that it is maintained in a position radial to the axis of the cutting cylinder at all times;

Figure 32 is a plan view, partly in section and partly broken away, of the construction shown in Figure 31, the view being taken in the direction of arrow 32 of that figure;

Figure 33 is a diagrammatic end view of the modified construction, and a folding-off unit assembly;

Figure 34 is a detail sectional view looking in the direction of arrow 34 of Figure 32;

Figure 35 is a sectional view taken on the line 35—35 of Figure 32 looking in the direction of arrow 35 of that figure;

Figure 36, which appears on the sheet with Figure 31, is a detail, partly broken away and partly sectional, view of part of the collecting cylinder looking in the direction of arrow 36 of Figure 31;

Figure 37 is an end view, partly in section, of a modified way of mounting the operating rod for giving the knife its radial movement, the view being taken on the line 37—37 of Figure 38 looking in the direction of arrow 37 of that figure;

Figure 38 is a partly broken away sectional view of the construction shown in Figure 37;

Figure 39 is a sectional end view of the collecting and cutting cylinder showing a further modification in the mechanism for maintaining the cutting knife in a position radial to the axis of the collecting cylinder;

Figure 40 is a sectional plan view of the cutting mechanism and part of the collecting cylinder shown in Figure 39, the view being taken on line 40—40 of that figure, and Figures 41, 42 and 43 are detail sectional views showing different positions of the parts.

Referring now to these drawings and first to Figure 1, the mechanism shown is the folder end of a printing machine, the printing mechanism not being illustrated. The particular construction shown is a double folder having a pair of longitudinal formers 1, 2, over which the printed webs or associated webs are fed to the folder. Each of these formers delivers to a folding and collecting mechanism, indicated generally by the numerals 3, 4, one of these folding and collecting mechanisms being provided for each former, the construction of which will be more fully hereinafter referred to. From the collecting and folding mechanism, the products are delivered from folding rolls 5, 6 to fly deliveries 7, 8, of the usual type, the products being finally delivered on the usual belts or tapes 9, 10, these deliveries, as shown, operating in opposite directions.

The various parts of the mechanism are supported in framing 11, of any suitable character, and the various parts of the mechanism are driven in any suitable way. As shown, the webs are forwarded to the folding and collecting mechanism through the usual nipping rolls 12, 13, 14, 15, and these rolls are driven through miter gears 16 from a shaft 17, driven in turn through a miter gear 18 meshing with a miter gear 19 on a vertical power shaft 20, this shaft being driven from any suitable prime mover, not shown. The collecting and folding mechanism is driven from the vertical power shaft 20, through a miter gear 21 meshing with a miter 22 on a horizontal driving shaft 23 provided with miters 24, 25, from which the collecting and folding cylinders are driven.

The folding-off rolls 5, 6 are driven from the collecting cylinder of the collecting and folding mechanism, as hereinafter more specifically referred to. The fly deliveries 7, 8 are driven from the power shaft 20 through a miter 26 meshing with a miter 27 on a horizontal shaft 28, the construction so far described being the usual one in this class of folders.

*The cutting mechanism.*—In accordance with one of the principal objects of the invention, a novel form of cutting mechanism for cutting a web or associated webs into product lengths has been provided in which the cutting blade is so mounted and operated that it enters or engages the web and leaves it on a line which is radial to the axis of the collecting cylinder, that is, the knife engages the product at a point ahead of the nipping point between the two cylinders and leaves the product at a point behind the nipping point of the two cylinders, which nipping point is on a line common to the centers of the cutting and collecting cylinders, and the cutting knife is maintained in this position during the cutting operation. While the mechanism for effecting this movement of the cutting knife may vary within wide limits, such mechanism will preferably be the same for each cutting and collecting cylinder in the machine and a description will therefore be given of but one set of cutting and collecting mechanisms.

Each cutting and collecting mechanism includes a collecting cylinder 29 and a cutting cylinder 30. Referring first to the cutting knife and its operation, this is best shown in Figures 2, 3 and 5. As there illustrated, the cutting cylinder 30 is carried on a shaft 31 supported in ball bearing journals 32, suitably mounted in the framing 11, before referred to. In the particular construction shown this cutting cylinder carries two cutting knives 33, 34, which in the construction illustrated in these figures are mounted so as to have a pivotal or rocking movement on the cylinder. While the specific mechanism for effecting this rocking movement may be varied, as shown, each cutting knife is mounted in a knife box 35, supported at each end in ball bearings 36 supported in brackets 37 secured to the cylinder 30. The cutting knife boxes 35 are given a pivotal or rocking movement by means of a fixed box cam 38 secured to one of the frames 11, as shown in Figure 5. For each cutting knife box 35 there is provided a cam roll 39, which is loosely journalled on an arm 40 pivotally connected to one end of a link 41, the pivot point being indicated at 43. The other end of this link 41 is pivotally connected at 43' to a lever arm 42 secured to the knife box. It will be understood that the construction for both the cutting knives is the same, the parts just described being provided for each of these cutting knives and the means for supporting and operating them. Adjacent the pivot point 43' of the arm 42, a rod 44 is connected, this rod being controlled by a spring 45, the action of this spring rod connection being to keep the cam roll 39 in engagement with the operative face of the box cam.

The cam is so shaped that as the cutting knife approaches the cutting point it is rocked so that as it engages the web it is held in a position which is radial to the axis of the folding cylinder, this position being maintained during the cutting operation and until the finish of the cutting operation. With this construction the cutting strain on the knife is directed through the center of the same, and side pressure which tends to break it is avoided. The knife enters or engages the web at a point prior to the nipping point of the cylinders, thus lengthening the time of cutting, and so avoiding any heavy shock or jar which is present when the cutting is performed in a short period, as with cutting mechanism in ordinary use. Furthermore, this method of controlling the cutting operation of the knife permits the knife blade to enter the product to a greater depth than it is possible with a mere rolling engagement, and it is thus possible to use a knife having its cutting edge inclined with respect to its knife box 35, thereby causing certain of the cutting teeth to engage the product in advance of other cutting teeth and consequently distributing the cutting shock by producing a shear cut.

The cutting and collecting cylinders may be driven in various ways. In the particular construction shown, the collecting cylinder is driven from the cutting cylinder. This cutting cylinder is driven from the shaft 23 through the miter 25, which meshes (see Figure 4) with a miter 46 on a shaft 47 supported in eccentric bushings 48 supported in the side frames 11, before referred to. This shaft 47 carries a gear 49 pinned to the hub of the miter 46, and this gear 49 meshes with a gear 50 keyed to the shaft 31 of the cutting cylinder. The cylinder 30 has secured thereto a gear 52, which in turn meshes with a gear 53 secured to the cylinder 29, thereby driving this folding and collecting cylinder. The gear 53 and cylinder 29 are rotatably mounted on cylindrical bearing bushings 48a supported by the eccentric bushing 48, before referred to, as best shown in Figures 4 and 5, and this large gear 53 in turn meshing with a gear 54, through which the folding-off rolls are driven, as hereinafter referred to.

*Sheet holding mechanism for the collecting cylinder.*—Cooperating with the cutting cylinder is the folding and collecting cylinder 29, before referred to. This cylinder acts to take the web, hold the web while product lengths are being cut therefrom, and fold off the product lengths as hereinafter more fully described.

In accordance with one feature of the invention, an improved means is provided for taking, holding and releasing the sheet, and this mechanism in the present instance is in the form of sheet taking pins. These pins are operated by a novel movement so as to have a rocking or rolling movement, that is, as the pins are engaged with and freed from the product they have a rolling or rocking motion, thus avoiding the quick acting cam mechanisms heretofore used, this construction being simpler and operable without danger of tearing or otherwise injuring the products. While the specific mechanism and the means for operating it may be somewhat varied, the particular collecting and folding cylinder shown is a three part cylinder, the operation of which is more fully referred to hereinafter, and such cylinder is provided with three sets of pins, marked 55, 56 and 57. These pins, which are of the usual removable form, are screwed into flattened faces on rock-shafts 58, 59 and 60, which are supported in suitable bearings 61, 62 formed in the cylinder walls. Each of the rock shafts 58, 59 and 60 carries, at one end, a double armed lever, the arms of which, as best shown in Figure 12, are marked 63, 64. The arm 64 of this lever carries a cam roll 65, the purpose of which will be hereinafter referred to, and the other arm 63 of the lever is connected to a spring rod connection 66. On the lever, intermediate the arms 64, 63, is a second cam roll 67, which engages the face of a fixed cam 68 secured to the framing 11, before referred to; this cam being shown in cross-section in Figure 4 and in dotted lines in Figure 3. This cam 68 is circular except for a short depressed inwardly extending portion, marked 69, and is clearly shown in Figures 2 and 3. In the best construction, this depressed portion is formed on a separate piece 70, shown in Figure 2, so that in case of wear this depressed portion can be removed without removing the whole cam. The spring rod 66 tends to force the cam roll 67 against the operating face of the cam and as the roll reaches the depressed portion it drops into such depressed portion and gives the pin rock-shaft a very quick rocking action to release the pin from the head of the product. It will be understood that during the normal operation of the cylinder the pins are forwardly inclined during the revolution of the cylinder except when the cam rolls drop into the depressed portions of the cam, the parts being timed so that this occurs when a product is to be folded off by the folding rolls, as hereinafter referred to, the pin shaft at this time being revolved so that the pins point backwards, as shown at the left-hand side of Figure 2, and thus quickly releasing the sheet.

It will be seen with this construction that the pins cooperate with the cutting mechanism so that the product is held on the folding cylinder by both its head and tail until the tucking blade has folded off the product into the bite of folding rolls hereinafter referred to.

It is, of course, understood that provision will be made for permitting this rocking or turning operation of the pins, this being done by providing a clear space in the cylinder wall, indicated at 71, and clearly shown in Figure 3 at the left-hand side. The cylinder 29 is also provided with folding-off blades which act to fold the product off from the cylinder into the bite of folding-off rolls hereinafter referred to, and in the particular construction shown two folding blades and their operating mechanism are shown, both these blades operating when the cylinder is not collecting, or only one of these blades operating when the cylinder is collecting, as will be more fully hereinafter described.

As shown, these folding blades are marked $x$ and $y$ and are supported in blade holders 72, 73. These blade holders are rotatably mounted in ball bearings 74, supported on the ends of a frame 75 carried on the shaft 47, before referred to, and as shown in Figures 3 and 4. At one end, each of the blade holders is provided with a gear 76, and this gear 76 is in mesh with an intermediate gear 77 supported on studs 78 on the frame 75, before referred to, this intermediate gear 77 in turn meshing with a gear 79 pinned at 80 to the eccentric bushing 48, before referred to, and as shown in Figures 3 and 4. As the frame 75 is rotated by the shaft 47, the gears 77 walk around the gear 79 and drive the gears 76 for rotating the folding blades to cause them to fold the products off into the folding rolls. It will be understood that with this construction the folding blades are kept within the cylinder except at the time when they are to fold the product off into the bite of the folding rolls.

*Shift mechanism for changing from a collect to a non-collect run.*—In the operation of folding and collecting cylinders it may be desirable at times to operate the cylinders so that the products are folded off from the cylinder as they come from the web forwarding mechanism, that is, the products are delivered straight from the folding cylinder to the folding-off rolls, such an operation being known as a straight run. In the production of certain other classes of products, however, particularly where a product of a large number of pages is desired, it may be desirable to collect two products on the collecting cylinder before they are folded off by the folding rolls. In accordance with the invention, a novel mechanism has been provided for effecting a change in the operation of the collecting cylinder from a collect run to a non-collect run and vice versa, this mechanism being of such character that it is operable from outside the cylinder. This mechanism preferably operates in conjunction with the mechanism by which the sheet taking pins are operated, and one of the folding blades is operated so that, when collecting, one of the folding blades is silenced, and the pin operating cam is actuated so that the pins do not free themselves from the product on every revolution of the cylinder.

While this mechanism may be of various characters, in the particular construction illustrated the mechanism is such that the blade control and the pin control are manipulated by a single handle, or other suitable mechanism at the same time, so that but one operation by the pressman is needed in changing from a collect to a non-collect run. In the particular construction shown, the shaft 47, before referred to, is hollowed out at one end to receive an actuating rod 81, this rod having a sliding movement in the shaft, see particularly Figures 4 and 5. The outer end of the shaft 47 has an interlocking collar 82 secured thereto, and the rod 81 projects beyond the collar and carries an actuator head 83 on the end. This head lies in a recess 84 in a control handle 85 pivoted at 86 to a bracket 87 suitably secured to the framing. The recess 84 of the operating handle 85 has formed on its inner walls a pair of ears 88, which are best shown in Figure 7, which when the handle is moved to the left, that is, to the position shown in Figure 6, engage the head 83 and pull the sliding rod out. To force or move the rod inwardly or toward the right, as shown in Figure 4, the handle is provided with a cap 89 having a pair of lugs 90, which are best shown in Figure 7, which act to force the rod inwardly into the shaft to the position shown in Figure 4.

The operation of this handle 85 effects the change from the collect to the non-collect operation of the collecting cylinder without any change being required in the mechanism for operating the pins or for operating the folding blades. The mechanism by which the pin and blade control is effected through this operating handle 85 may be varied within certain limits, but a convenient and satisfactory construction is that shown in the drawings and best shown in Figures 8 and 10. Referring now to these figures, in the particular construction illustrated the folder blade Y is the blade which is put out of action during a collect run, and the mechanism by which this is effected will now be described.

The push rod 81, before referred to, is provided with a slot 91 which receives one end of a lever 92 pivoted at 93 in a yoke bracket 94 secured to the frame 75 of the cylinder 29, before referred to. The other end 95 of this lever arm engages in a slot 96 in a rod 97 sliding in a bracket journal 98, also secured to the frame 75, before referred to. The outer end of this push rod 97 carries a cam 99 and also carries a fork-lever 100. The lower end 101 of this fork-lever engages a groove 102 of a clutch collar 103 slidable on the end of the folding blade shaft, indicated by the numeral 104. This clutch engages a corresponding clutch member 105 forming a portion of the hub of the gear 76 which drives the shaft 104 carrying the folding blade 73.

In the mechanism as illustrated in Figure 6, the parts are in a non-collect position, and the parts shown in Figure 4 are in a collect position. To shift from a non-collect to a collect position, the operating handle 85 is shifted from the position shown in Figure 6 to the position shown in Figure 4. This movement of this handle operates the rod 81, which through the yoke lever 101 and its yoke 102 disengages the clutch and brings it into the position shown in Figure 10. This clutch being disengaged, the gears 76, 77 operate idly and the folding blade 73 is silenced so that its folding-off function is stopped. This same movement of the operating handle 85, through the lever 92, moves the push rod 97 to the right, as shown in Figure 10, which brings the cam 99 into engagement with the cam roll 65. As best shown in Figure 3, this cam is adjustably mounted on the lever 100 so that it can have an adjustment, as indicated by adjusting screws 108, this adjustment being provided so that the cam may be adjusted to compensate for wear or any other desired reason.

It will be observed that with this construction the cam roll 65 rides on the nose of the cam 99 and prevents the cam roll 67 from dropping into the depression 69 in the cam 68. It will be understood that the roll 65 and the cam 99 advance together as the cylinder rotates, and during this advancing movement the roll 65 is maintained in such a position that the cam roll 67 is prevented from entering the low point 69 in the cam 68. Although the roll 65 and the cam 99 advance together, the cam 99 advances at a greater speed than the roll 65, because the frame 75, which supports the cam 99, moves one-half a revolution while the cylinder 29, which supports the roll 65, advances one-third of a revolution. The cylinder 29 rotates about the centers of the eccentric bushings 48 as its axis, and the frame 75 rotates on the shaft 47. This eccentric relationship between the cylinder 29 and the frame 75 causes the roll 65 to move radially from the cam 99 as the roll 65 and cam 99 advance, but inasmuch as the outer surface 99a of the cam 99 is inclined with respect to the periphery of the cylinder 29, as shown in Figure 3, this surface will continue to engage the roll 65 until the cam roll 67 has passed the low portion 69 of the cam 68. Inasmuch as the frame 75, which carries the cam 99, makes one-half of a revolution while the cylinder 29 is making one-third of a revolution, the cam 99 is only presented to a roller 65 at each complete revolution of the frame 75 and two-thirds of a revolution of the cylinder 29, and since the collected products are folded off at each two-thirds of a revolution of the cylinder 29, this arrangement permits the gathering pins to collect the products and then tilt and release the collected products, as shown in Figures 18 to 24 inclusive. When, however, it is desired that the pins 56 release the product, the parts are so adjusted that the cam roll 65 does not engage the face of the cam 99 inasmuch as the cam 99 has been moved from the path of travel of the roller 65. In this position of the parts, the roll 67 may drop into the low part 69 of the cam 68, rocking the pin shaft 59, as before described, and freeing the pins from the product, this movement occurring on a non-collect run as each folding blade passes the folding rollers, but on a collect run one folding blade will be silenced and every alternate product cut from the web will be held on the collecting cylinder and carried around to release a second product.

To change from a collect to a non-collect run, it is simply necessary to move the operating handle to the position shown in Figure 6. This changes the operation of the mechanism, the clutch 103 then engaging so that the gears 76, 77 drive the folding blade 73, and the cam 99 is moved out of engagement with the cam roll 65, so that the pins free every product when it reaches the folding-off rollers.

In the best constructions, means are provided for locking the parts in position so that they can be operated only when the cylinders are in correct relation with each other. In the particular construction illustrated for effecting this, the locking collar 82 is provided with a groove 109 with which a projection 110 on an extension 111 of the operating handle is adapted to engage. When the groove 109 and the projection 110 register, then the handle may be moved to the position shown in Figure 6, but in any other position it is locked against movement. In the best constructions, means are provided for locking the parts in collect position, non-collect position, or neutral position, and a convenient means for effecting this is shown in Figures 8 and 10. In the particular construction illustrated, there is provided a spring rod construction 112 having a rounded end 113, this rod working in a bracket 114 secured on a stud 115 on which the gear 77 is supported. The clutch member 103 is provided with a notch 116, with which the rounded end 113 of the spring rod is adapted to engage. In the non-collect position the spring rod is snapped outside of the clutch member, thus preventing any right-hand endwise movement, as shown in Figure 8. In the neutral or transition position, as shown in Figure 9, the rounded end 113 engages the notch 116, thus preventing the shaft 104 from turning and holding the parts in proper alignment. In the position shown in Figure 10, the rounded end 113 of the rod 112 is snapped to the inner side of the clutch member 103, and a stop 117 now engages the notch 116, as shown in Figure 10, thus holding the folding blade in locked position for operating on a collect run.

With this construction it will be seen that the mechanism may be altered from the outside of the machine and without requiring any change in the operating mechanism, so that the pressman can quickly and readily change from a collect to a non-collect run without requiring him to reach inside the cylinder for effecting this change, and this change may be made very easily and rapidly, and the parts will be held locked in the desired position during either operation of the cylinder.

The handle 85 is locked in either the collecting or non-collecting position by means of a hand operated spring pin construction 118, this pin being operable in holes 119, 120, formed in the arm, and in a projection 121 in the bracket 87, before referred to.

Machines constructed in accordance with the present invention, in its best form, will include a novel abutment with which the cutting knife cooperates to cut the web or associated webs into product lengths, and in the best constructions this abutment will be so constructed that it will automatically free itself from paper dust which accumulates during the cutting operation. While the particular construction and arrangement of this abutment may be somewhat varied in construction, a convenient one is that shown in detail in Figures 13 and 14, and generally shown in Figures 3, 5 and 11. Referring to these figures, the wall of the cylinder 29 is recessed to provide a seat for a cutting block 122, the knife receiving portion of which is made of rubber or other suitable resilient material. This cutting block is formed with a slot 123 to receive the knife, and at the end of this block is formed to receive a hollow tube 124 provided with a slot 125 which registers with the slot 123 in the block. At each end of the block there is provided a pair of blocks 126, 127, of metal or other suitable material, these blocks being formed with semi-circular openings to form air ducts leading to the tube 124. As shown in Figure 13, which shows the block 126, the opening 128 is formed on the face of the block in the direction of the rotation of the cylinder, whereas the opening 129 in the block 127 is in the opposite direction, that is, facing away from the direction of the rotation of the cylinder. Owing to the speed of the cylinder, a current of air is set up through the tube 124 and keeps the cutting blocks free of paper dust, which has been found to be an advantage in this type of folding and cutting mechanism. The blocks 126, 127, which in turn support the cutting block 122, may be held in place in any suitable manner, as by plates 130 secured in any suitable manner to the cylinder face.

The cutting knife and the means for mounting it are of the usual construction, this knife shown as operating, see Figure 3 for instance, between a pair of cutting cheeks 131, 132, which are operated by springs 133, as shown, for instance, in Figure 27. It will be understood, of course, that provision will be made for the passage of the journals supporting the cutting knife as the two cylinders pass the nipping point during the cutting action, and this is conveniently effected by cutting away the face of the collecting cylinder adjacent the cutting blocks, as indicated at 134, 135 in Figures 5 and 11, so that no interference of the parts of the mechanism takes place.

*Folding-off roll units.*—In the operation of the folding and collecting mechanisms as above described, the folding blades fold the products off from the folding and collecting cylinder into what are known as folding rolls which give the products a transverse fold. In accordance with one of the objects of the present invention, an improved mechanism is provided in which the folding-off rolls are constructed and arranged as a unit, so that these folding-off rolls may be removed from the machine for replacement or repair without disturbing any of the other parts of the folder. Furthermore, in these folding-off constructions, provision must be made for automatically taking care of products of varying thicknesses, so that constant adjustment of the mechanism is unnecessary. The present invention provides an improved means for effecting these results, and one preferred construction is shown in the drawings. Referring particularly to Figures 15, 16 and 17, as there shown, the folding-off unit comprises a pair of folding rolls 136, 137, into which the product, indicated by the letter P, is directed by one of the folding blades 73. These folding rolls are mounted in ball bearing journals 138, 139 supported in the upper ends of lever arms 140, 141, pivoted on shafts 142, 143, journaled in bearings 144 mounted on brackets 145 supported on framing 146, which is secured to brackets 146' by bolts 148. The brackets 146' are secured to the frame 11 of the machine, before referred to, in any suitable manner. It will be understood that by removing the bolts 148 the whole folding mechanism may be removed as a unit without disturbing any other parts of the machine.

In accordance with the invention, means are provided for automatically regulating the movement of the folding rolls 136, 137 relatively to each other so as to accommodate products of different thicknesses, or in case of products jamming at the folding rolls. In the particular construction for effecting this there is provided, at each end of the machine, a shaft 149 which is supported in bushings 154 that slide in boxes 150 formed in brackets 151, depending from the main frame 146 of the folding roller unit. The lower ends 152 of the levers 140, 141 are yoke-shaped and engage over the shaft 149, being held between the collars 153, forming part of the bushing 154, and collars 155, slidable on the shaft 149. The bushings 154 are provided with right and left-hand screw threads, and the ends of the shafts are provided with corresponding right and left-hand screw threads, these being indicated at 156, 157 in Figure 15, these threaded shaft ends operating in the threaded bushings 154, and between the collars 155 on the shaft 149 is a spring 158. It will be observed that by turning the shaft one way or the other, the bushings 154 may be made to move toward or away from each other. This the compression of the spring 158 may be adjusted, and this adjustment regulates or controls the distance between the two folding rolls 136, 137.

In the best constructions, means are provided for manipulating the shaft for effecting this control, so that both ends of each of the rolls are simultaneously and quickly adjusted. While this may be effected in various ways, in the particular construction shown there is provided a cross-shaft 159 mounted in brackets 160, this shaft being provided at each end with worm gears 161, 162, this shaft being operated preferably by a hand-wheel from outside the machine, this wheel not being shown. The worm gears 161, 162 engage worm wheels 163 on one end of each of the shafts 149, so that by manipulating the shaft 159 the rolls are simultaneously and quickly adjusted at each end.

In the best constructions, in addition to the simultaneous adjustment just described, the mechanism will be provided with means for independently adjusting the folding rolls, so that if desired either of the rolls may be moved away from the other roll, the position of one of the rolls remaining stationary. While this adjustment may be effected in various ways, in the particular construction shown the bushings 154 and the collars 153 are mounted so that they may be given an individual adjusting movement. As shown, at the ends of the shaft 149, these collars are formed with recesses, indicated at 164, a sufficient number of these recesses being provided for effecting any desired adjustment.

Cooperating with these recesses is a locking bar 165, which is pivoted at 166 to a plate 167 carried on the journal 153, before referred to. This locking bar is held in locking relation with the notches in the collar by means of a spring 168 and, as best shown in Figure 17, it will be observed that by freeing this spring the locking bar may be released from any of the notches 164 with which it may be engaged, and by means of a suitable tool the collar 153 may then be turned one or more notches, as desired, whereupon it is again locked in position by placing the locking bar in one of the notches 164.

With this construction it will be seen that the folding rolls may be adjusted simultaneously or independently, and the whole folding assembly may be used as a unit, and a compact and simple structure has been produced.

The folding rolls may be driven in any suitable or desired manner. In the particular construction shown, these folding rolls are driven from the gear 53, before referred to, on the collecting cylinder 29. This gear 53 is in mesh with the intermediate gear 54 mounted on a stud 170 carried in brackets 145 and shown at the right-hand side in Figure 16.

This gear 54 meshes with a gear 171 on one end of a cross-shaft 172 supported in a portion of the brackets 145, before referred to. On the other end of this shaft 172 is a gear 173 which meshes with a gear 174 rotatable on the shaft 142, before referred to. The gear 174 is in mesh with a gear 175 rotatable on the shaft 143, and the gear 175 is in mesh with a gear 175' secured to the shaft of the folding roller 137. The gear 174 is also in mesh with a gear 176 that is secured to the folding roller 136.

With this construction the folding rolls 136, 137, may be adjusted simultaneously to vary the distance between them to accommodate products of varying thicknesses, and at the same time these rolls may have a movement to and from each other in case of a jam in the products coming through them. Furthermore, individual adjustment may be given each of the rolls relatively to the other and the whole folding off mechanism can be removed from the machine as a unit for replacement and repair.

As before stated, the particular folding cylinder illustrated is what is known as a three part folding and collecting cylinder, and the operation of this cylinder in folding off a product is diagrammatically illustrated in Figures 18 to 24. Referring to these figures, the cylinder is shown as provided with three sheet holding surfaces, marked $1^\times$, $2^\times$ and $3^\times$. Referring first to Figure 18, this shows the start of a collecting operation, it being understood that during the description of these figures the folder blade marked $y$ is silenced, the folding-off being effected by the folding blade marked $x$. In Figure 18, the pins 56 have taken the head end of the first sheet and have carried it around on surface $1^\times$. This sheet is cut off and is moved to the position shown in Figure 19, this latter figure showing the second sheet, which has been taken on surface $3^\times$ and has been released by the pins 57, and this sheet is folded off by the blade $x$ from the folding surface $3^\times$ and is discarded. In this position the pins 55 are taking the third sheet on surface $2^\times$ and the first sheet has been advanced one-third around the cylinder. In Figure 20 the pins 56 are shown as taking the fourth sheet and associating it with the first sheet on surface $1^\times$. In Figure 21 the first and fourth sheets are being shown as folding off, and the third sheet shown as advanced two-thirds around the cylinder, and the pins 57 are shown as taking the fifth sheet, and in Figure 22 the fifth sheet is shown as being forwarded by the pins 57, while the pins 55 are collecting the third and sixth sheets, and this operation is repeated during the collection of the products.

The mechanism so far described is a preferred one for carrying out the various features of the invention. Certain modifications, however, are provided by the invention which may be used under some circumstances in operating the cutting blade so that it will have the proper movement relative to the collecting cylinder during the cutting operation, and certain of these modifications in which a single cutting blade is used will now be described.

Referring first to Figures 25 to 30, in the construction shown in these figures the cutting knife carrier 178 is supported in a frame 179, which is carried on a cross-shaft 180 keyed to heads, one of which is shown marked 181, which form a part of the frame. The shaft 180 projects through the frame at both ends and is rotatably supported in hubs 182 of arms 183, each of which is supported on a stud 184 mounted in a head 185 rotatably supported in the main side frame 11 of the machine. The heads 185 are provided with extensions 186, to one of which is secured a gear 187 which is in mesh with a gear 188 mounted on a shaft 189 supported in an eccentric journal 190 supported by the framing 11 and corresponding with the shaft 47, shown in Figure 4. This gear 188 is in mesh with a gear 191 on a shaft 192. This shaft 192 also carries a gear 193 in mesh with a gear 194 secured to the end wall 195 of the collecting cylinder. The gear 188 is driven from the gear 194 through the gear 193, shaft 192 and gear 191, and this gear 188 in turn drives the gear 187, which in turn drives the head 185. The head 185, before referred to, turns on a shaft 196 that is fastened to a bracket 197 secured to the framing 11. At the inner end, this shaft 196 has keyed thereto a small gear 198 which meshes with an intermediate gear 199, which in turn meshes with a gear 200 fixed to an extension 201 of the lever arm 183, before referred to, which is rotatable on the stud 184. This lever 183 supports the shaft 180, before described, and gives the cutting knife a motion in which the knife is held substantially parallel to a plane passing through the axes of the folding cylinder and knife carrier. This gear arrangement, in effect, is a planetary gearing, the gear 200, through the intermediate gear 199, walking around the fixed gear 198.

In the best constructions, where a gearing system as described is employed, means are provided for compensating for a slight variation between the speed of the cutting knife and the peripheral speed of the collecting cylinder while the cutting knife is in cutting engagement with the product. While the specific mechanism employed for this may vary to some extent, in the particular construction illustrated the shaft 180, before referred to, has keyed thereto a hub 202 which is provided with a projection 203. As best shown in Figure 29, the arm 183, before referred to, is formed with a lug 204. This lug is recessed at 206, and in this recess is mounted a spring 207, this spring being preferably adjusted by a screw 208. This spring, at its inner end, bears against the under side of the projection 203, before referred to. This construction permits a yielding movement of the cutting knife carrier 178, before referred to, with respect to the lever 183. A set screw 209 may be provided for limiting the movement or play of the lever arm 182, 183.

The frame 179 is formed with a projection 179a that engages with a roller 179b, rotatably supported on a stud 179c, secured to the collecting cylinder 195. The roller engages the projection as the cutting knife approaches the collecting cylinder and serves to bring the knife into proper alignment, the spring 207 meanwhile acting to permit the requisite movement of the knife holding mechanism relatively to the levers 182, 183.

Referring to Figures 31 to 36, in the construction shown herein, the cutting knife is maintained in a position radial to the axis of the collecting cylinder by means of an oscillating rod. The knife carrier box 210 is supported and driven in a manner similar to that described with reference to Figures 25 to 30. In the present construction, however, arm 183 has secured thereto a projection 212, best shown in Figure 31, to which is secured one end of a rod 213. The other end of this rod slides in a sheath 214, carried in an eccentric strap 215 journaled on the eccentric bushing 190, this eccentric bushing being the same as that shown in Figures 25 to 30. With this construction, it will be seen that the bar 213 is oscillated as the heads 185 are rotated and the cutting blade is given a movement whereby it is maintained radial to the axis of the collecting cylinder at all times.

In Figures 37 and 38, a means is shown for adapting the mechanism shown in Figures 31 to 36 to the cutting of alternately long and short products. With this mechanism, when products are to be collected, the product that is to be folded outside may be cut longer than the inside product. This is accomplished by presenting the cutting edge of the knife to the collecting cylinder in alternately raised and lowered positions, thus cutting every alternate product longer than the others. It will be understood that when the products are folded together with the longer product on the outside that their edges will be even.

The engaging position of the knife is changed by means of an eccentric 215a which is interposed between the eccentric bushing 190 and the eccentric strap 215 which carries the guiding sheath for the rod 213. A gear 215b is formed integral with the eccentric 215a and meshes with an idler gear 215c which meshes with a gear 215d secured to a shaft 215e, to which a gear 215f is also secured. The shaft 215e is rotatably supported in a bracket 215g which is secured to the frame of the machine. The gear 215f meshes with the gear 194 on the collecting cylinder and the eccentric 215a is thus rotated to produce the deflection of the cutting knife required for cutting alternately long and short products. When this mechanism is used, the guiding roller 179b and the cooperating projection 179a are omitted and an opening is provided in the collecting cylinder that is of sufficient width to permit the entrance of the cutting knife in either of the two cutting positions.

In Figures 39 to 42 is shown a further modification for effecting and maintaining the radial movement of the knife relatively to the collecting cylinder during its cutting motion. In the construction shown in these figures two knives are shown, each supported in a knife carrier 216 provided with a gear 217 which meshes with an intermediate gear 218, which in turn meshes with a stationary gear 219 bolted to a sleeve 220 that is secured to the frame 11, concentric with the ball bearing journal 221 of the shaft 222 of the cutting cylinder. The cutting cylinder, in this construction, is driven in the same manner as that heretofore described with reference to Figures 1 to 17 and need not further be here described.

Figures 41, 42 and 43 show the different positions assumed by the knife during the cutting operation, and it will be seen that with this construction the knife is given and maintained in a position radial to the axis of the collecting cylinder during the cutting operation.

With the construction, both in its preferred and modified forms, as described it will be seen that an improved folder construction has been provided by which an increased production speed is possible and an improved product obtained. The various mechanisms employed may, of course, be widely varied in details of construction, and the invention is not to be limited to the specific constructions described and shown.

What I claim is:

1. In a folder, a folding cylinder, a cutting mechanism including a cutting knife, and means for manipulating the cutting knife so that it engages with and leaves the web in substantially radial relationship to the axis of the folding cylinder.

2. In a folder, the combination of web forwarding means, a folding cylinder, a carrier, a cutting blade movably mounted thereon, and means for moving the cutting blade so that it engages with and leaves the web in substantially radial relationship to the axis of the folding cylinder.

3. In a folder, the combination of web forwarding means, a folding cylinder to which the web is forwarded, a cutting blade carrier, a cutting blade pivotally mounted on the carrier, and means for moving the cutting blade so that it engages with and leaves the web in substantially radial relationship to the axis of the folding cylinder.

4. In a folder, the combination of web forwarding means, a folding cylinder to which the web is forwarded, a cutting blade carrier, a cutting blade pivotally mounted on the carrier, and a cam for rocking the blade to present it for engagement with the web in substantially radial relationship to the axis of the folding cylinder.

5. In a folder, the combination of web forwarding means, a folding cylinder, a cutting knife, a carrier therefor, and means to present the knife for engagement with the web in substantially radial relationship to the axis of the folding cylinder.

6. In a folder, the combination of web forwarding means, a folding cylinder to which the web is forwarded, a cutting blade carrier, a cutting blade mounted on the carrier, a cam shaped to rock the blade so that it is presented for engagement with the web in substantially radial relationship to the axis of the folding cylinder, a cam roll, and means for holding the roll in engagement with the cam.

7. In a folder, the combination of web forwarding means, a rotary folding mechanism, a cutting knife, and means for operating the cutting knife so that it engages with and leaves the web in substantially radial relationship to the axis of the folding mechanism.

8. In a folder, the combination of a folding cylinder to which web material is forwarded, a cylinder having a cutting knife mounted thereon, and means for manipulating the cutting knife so that it engages the web at a point in advance of the nipping point between the cylinders with a movement which presents the plane of the blade substantially radial to the axis of the folding cylinder.

9. In a folder, the combination of web forwarding means, a folding cylinder to which the web is forwarded, a cutting blade carrier, a cutting blade movably mounted on the carrier, and gearing for moving the blade to present it for engagement with the web in substantially radial relationship to the axis of the folding cylinder.

10. In a folder, the combination of web forwarding means, a folding cylinder to which the web is forwarded, a cutting cylinder, a cutting blade pivotally mounted on the cylinder, and gearing for moving the blade to present it for engagement with the web in substantially radial relationship to the axis of the folding cylinder.

11. In a folder, the combination of web forwarding means, a folding cylinder to which the web is forwarded, a cutting blade carrier, a cutting blade rotatably mounted on the carrier, and means for rotating the blade so as to present it for engagement with the web in substantially radial relationship to the axis of the folding cylinder.

12. In a folder, the combination of web forwarding means, a folding cylinder to which the web is forwarded, a cutting blade carrier, a cutting blade rotatably mounted on the carrier, and gearing for rotating the blade so as to present it for engagement with the web in radial relationship to the axis of the folding cylinder.

13. In a folding mechanism, the combination of a folding cylinder, sheet taking pins for holding products on the cylinder, a cam having an operating face shaped to give the pins a rolling or rocking movement sufficient to release the product, a cooperating cam roll, and a second cam operable to prevent the operation of the pins on alternate revolutions.

14. In a folding mechanism, the combination of a folding cylinder to which web material is forwarded, sheet taking pins for holding the material mounted on the cylinder, and means for operating the pins with a rolling or rocking movement of sufficient amplitude to release the material.

15. In a folding mechanism, the combination of a folding cylinder to which web material is forwarded, sheet taking pins for holding the material mounted on the cylinder, means for operating the pins with a rolling or rocking movement of sufficient amplitude to release the material, and a folding blade for folding off the material after it has been released by the pins.

16. In a folding mechanism, the combination of a folding cylinder, sheet taking pins for holding products on the cylinder, and a cam having a low point shaped to roll or rock the pins rearwardly sufficient to release the product.

17. In a folding mechanism, the combination of a folding cylinder, sheet taking pins for holding products on the cylinder, a cam having a low point shaped to give the pins a rolling or rocking movement sufficient to remove it to product releasing position, a cooperating cam roll, and means for permitting the operation of the roll on each revolution of the cylinder or on alternate revolutions.

18. In a folding mechanism, the combination of a folding cylinder, sheet taking pins for holding products on the cylinder, a cam having an operating face shaped to give the pins a rolling or rocking movement of sufficient amplitude to release the products, and a cooperating cam roll.

19. In a folding mechanism, the combination of a folding cylinder, sheet taking pins for holding products on the cylinder, a cam shaped to give the pins a rolling or rocking movement sufficient to release the products, a cooperating cam roll, and a second cam and roll having a movable operating face for controlling the operation of the pins.

20. In a folder, the combination of a cylinder, folding and collecting devices carried thereby, and common means operable from without the cylinder for changing the folding and collecting mechanism from a collect to a non-collect position and vice versa.

21. In a folder, the combination of a cylinder, folding and collecting devices carried thereby, common means operable from without the cylinder for changing the folding and collecting mechanism from a collect to a non-collect position and vice versa, and means for locking the parts in either position.

22. In a folder, the combination of a cylinder, folding blades carried thereby, sheet taking pins carried thereby, these mechanisms being operable at each revolution of the cylinder, and common means operable from without the cylinder for simultaneously silencing a folding blade and for causing the pins to operate on alternate revolutions of the cylinder for collecting.

23. In a folder, the combination of a cylinder, folding blades carried thereby, sheet taking pins carried thereby, these mechanisms being operable at each revolution of the cylinder, common means operable from without the cylinder for simultaneously silencing a folding blade and for causing the pins to operate on alternate revolutions of the cylinder for collecting, and means for locking the parts in either position.

24. In a folder, the combination of a cylinder, folding blades carried thereby, sheet taking pins carried thereby, these mechanisms being operable at each revolution of the cylinder, an actuator rod, single means located outside the cylinder for actuating the rod, connections from the rod for silencing a folding blade, and connections from the rod for preventing the operation of the pins on alternate revolutions of the cylinder.

25. In a folder, the combination of a cylinder, folding blades and sheet taking pins carried thereby operable at each revolution of the cylinder, a sliding actuator, single means located outside the cylinder for sliding the actuator, and connections controlled by the movement of the actuator for simultaneously adjusting the folding blades and the pins to a collect or a non-collect position.

26. In a folder, the combination of a cylinder, folding devices carried thereby, means for driving the folding devices, sheet taking pins carried by the cylinder, a cam for causing the pins to release a product at each revolution of the cylinder, a second cam for preventing the operations of the first cam on alternate revolutions of the cylinder, a common actuator for controlling the action of the driving means for the blades and the operations of the second cam, and single means operable from outside the cylinder for manipulating the actuator.

27. In a folder, the combination of a cylinder, folding blades and sheet taking pins carried thereby operable at each revolution of the cylinder, a sliding actuator, single means located outside the cylinder for sliding the actuator, connections controlled by the movement of the actuator for simultaneously adjusting the folding blades and the pins to a collect or a non-collect position, and means for locking the actuator in position.

28. In a folder, the combination of a cylinder, folding devices carried thereby, means for driving the folding devices, sheet taking pins carried by the cylinder, a cam for causing the pins to release a product at each revolution of the cylinder, a second cam for preventing the operations of the first cam on alternate revolutions of the cylinder, a common actuator for controlling the action of the driving means for the blades and the operations of the second cam, single means operable from outside the cylinder for manipulating the actuator, and means for locking the actuator in position.

29. In a folder, the combination of a cylinder, folding devices carried thereby, gears for driving the folding devices, sheet taking pins carried by the cylinder, a cam for causing the pins to release a product at each revolution of the cylinder, a second cam for preventing the operation of the first cam on alternate revolutions of the cylinder, a common actuator for controlling the gears for the folding blades and the operation of the second cam, and single means operable from without the cylinder for manipulating the actuator.

30. In a folder, the combination of a cylinder, folding devices carried thereby, gears for driving the folding devices, sheet taking pins carried by the cylinder, a cam for causing the pins to release a product at each revolution of the cylinder, a second cam for preventing the operation of the first cam on alternate revolutions of the cylinder, a common actuator for controlling the gears for the folding blades and the operation of the second cam, single means operable from without the cylinder for manipulating the actuator, and means for locking the actuator in position.

31. In a folding mechanism, the combination of a folding and collecting cylinder, common means operable from without the cylinder for operating it for a straight or a collect run, a cooperating cutting cylinder having a cutting knife, and means for actuating the cutting knife to engage a product on the collecting cylinder at a point in advance of the nipping point between the cylinders with a movement radial to the axis of the collecting cylinder.

32. In a folding machine, the combination with a folding cylinder, of a folding mechanism to which the cylinder delivers products, said folding mechanism including an independent frame, folding rolls yieldingly supported in the frame and movable relative to each other, a gear train operably supported by the frame for driving the roll, said gears permitting relative movement of the rolls without changing their operative relationship, the folding mechanism being removable from and replaceable in the machine as a unit.

33. In a folding machine, the combination with a folding cylinder, of a folding mechanism to which the cylinder delivers products, said folding mechanism including a frame, folding rolls and means for driving them operably supported by the frame and removable from and replaceable in the machine as a unit.

34. In a folding machine, a folding mechanism including means for folding a product and means for driving the folding means said folding means and driving means being operably supported on an independent frame, said frame folding mechanism and driving means being removable from and replaceable in the machine as a unit.

35. In a folder, a folding mechanism including folding rolls and means for driving them operably supported by an independent frame which is removable from and replaceable in the machine as a unit.

36. In a folding machine, the combination of a frame, a pair of folding rolls mounted in the frame, means supported by the frame for driving the rolls, means for adjusting the rolls relatively to each other, and means for permitting movement of the rolls to and from each other, said frame, folding rolls and folding roll driving means being removable from and replaceable in the machine as a unit.

37. In a folding machine having a frame, the combination with separate framing, of a pair of folding rolls, arms resiliently supported on the framing and in which the rolls are mounted to permit automatic separation of the rolls, means for adjusting the rolls to and from each other, means for locking the parts in adjusted position, and means supported by the framing for driving the rolls.

38. In a folding mechanism, the combination with framing, of a pair of folding rolls, separate lever arms in which the rolls are supported, spring means common to the separate lever arms and permitting the automatic separation of the rolls, means for adjusting the rolls to and from each other, means for driving the rolls, said mechanism being removable from the framing as a unit.

39. In a folding mechanism, the combination of a folding cylinder, sheet taking pins for taking and forwarding products and normally held in product forwarding position, and means for rocking the pins sufficiently to release the product.

40. In a folding mechanism, the combination of a folding cylinder, sheet taking pins for taking and forwarding products and normally held in product forwarding position, and a cam for rocking the pins sufficiently to release the product.

41. In a folder, the combination of a folding cylinder and a folding blade, a pair of folding rolls and common resilient means normally tending to move the rolls toward each other but permitting them to move away from each other when a product is tucked between them so that they will align themselves with respect to the folding blade.

42. In a folder, the combination of a folding cylinder and a folding-off blade, a pair of folding rolls, and a common spring means normally tending to move the rolls toward each other but permitting them to move away from each other when a product is tucked between them so that they will align themselves with respect to the folding blade.

43. In a folder, the combination of a folding cylinder, a rotary blade carrier, a cutting blade carried thereby, and means to effect an operative movement of the blade in which the blade remains in radial relationship with respect to the folding cylinder.

44. In a folder, the combination of a folding cylinder, a rotary blade carrier, a cutting blade carried thereby, and gearing arranged to effect an operative movement of the blade in which the blade remains in radial relationship with respect to the folding cylinder.

45. In a folder, the combination of a folding cylinder, a cutting blade carrier, a cutting blade mounted on the carrier, and means including an oscillating rod for operating the blade so that it is maintained in a position in which its plane is radial to the axis of the folding cylinder during the cutting operation.

46. In a folder, the combination of a folding cylinder, a cutting blade carrier, a cutting blade mounted in the carrier, an oscillating rod and tangential connections for operating the blade so that it is maintained in a position in which its plane is radial to the axis of the cylinder during the cutting operation.

47. In a folder, the combination of a folding cylinder, a cutting blade carrier, a cutting blade mounted on the carrier and gearing for effecting a rotary movement of the blade so that the blade is presented to the cylinder in substantially radial relationship to the axis of the cylinder.

48. In a folder, the combination of a folding and collecting cylinder, a cutting blade carrier, a cutting blade mounted thereon, and means for manipulating the blade to cooperate with the cylinder so as to cut sheets of different lengths on alternate cutting movements of the blade, and means for simultaneously folding sheets of different lengths from the cylinder to produce a product of uniform length.

49. In a folder, the combination of a folding and collecting cylinder, a cutting blade carrier, a cutting blade mounted thereon, and means for presenting the cutting edge of the blade to the cylinder in alternately raised and lowered positions to cut sheets of different lengths on alternate cutting movements of the blade, and means for simultaneously folding sheets of different lengths from the cylinder to produce a product of uniform length.

50. In a folding mechanism, the combination of a folding cylinder, a folding blade, folding rolls, sheet taking pins mounted on the cylinder for holding a product thereon, and means whereby both the head and the tail of the sheet are held on the folding cylinder until engaged and controlled by the folding blade and folding rolls.

51. In a folding mechanism, the combination of a folding cylinder, a folding blade, folding rolls, sheet taking pins for holding a product on the cylinder, and a cutting mechanism, said sheet holding pins and cutting mechanism being arranged to hold a product on the folding cylinder until it is engaged and controlled by the folding blade and folding rolls.

52. In a folding mechanism for use in printing machines, the combination of a folding and collecting cylinder, means operable from without the cylinder for completely conditioning it for a straight or collect run, a cooperating cutting cylinder having a cutting knife, and means for so actuating the cutting knife that it is presented to a web passing to the collecting cylinder at a point in advance of the nipping point between the cylinders the knife being presented to the web and maintained during the cutting operation in a position which is radial or substantially radial with respect to the axis of the folding and collecting cylinder.

53. In a folder, the combination of a folding cylinder and a folding blade, a pair of folding rolls, means for operably mounting the rolls, and a common resilient member influencing the roll mounting means to move the rolls toward each other but permitting the rolls to align themselves with respect to the folding blade when the product is being tucked between them by the blade.

54. In a folder, the combination of a folding cylinder and a folding blade, a pair of folding rolls, means for operably mounting the rolls, and a common resilient member engaging the roll mounting means to hold the rolls in predetermined positions and to permit the rolls to operably float when engaged by the blade to thereby align themselves with respect to the folding blade when the product is being tucked between them by the blade.

55. In a folder, the combination of a folding cylinder and a folding blade, a pair of folding rolls, means for operably mounting the rolls, adjusting members, a common resilient member adapted to normally hold the said roll mounting means in engagement with the adjusting members to yieldingly support the rolls in an operative position, the resilient members yielding to permit the folding rolls to operably float to thereby align themselves with respect to the folding blade when the blade operably engages the rolls.

56. In a folding mechanism, a folding cylinder, sets of sheet taking pins operably supported thereby, means for operating the said pins for non-collect runs, means cooperating with the said pin operating means to cause the pins to operate for collect runs, folding blades, means for operating the folding blades for either collect or non-collect runs, and common means located for convenient manipulation outside the cylinder for controlling the operation of the folding blades and the sheet taking pins to cause the said blades and pins to operate for either collect or non-collect runs.

57. In a folding mechanism, a folding cylinder, sets of sheet taking pins, means for operably supporting the said pins, folding blades, means for operably supporting the folding blades, means for operating the folding blades for either collect or non-collect runs, means for operating the said pin supporting means and pins, means carried by the said folding blade supporting means and cooperating with the said pin operating means to cause the sheet taking pins to operate for collect runs, and common means located for convenient manipulation from a point outside the folding cylinder for controlling the operation of the folding blades and the sheet taking pins.

JOHN R. TOMLIN.